United States Patent
Schmitter et al.

(10) Patent No.: US 6,310,220 B1
(45) Date of Patent: Oct. 30, 2001

(54) STABILIZING POLYCARBONATES

(75) Inventors: André Schmitter, Hegenheim (FR); Alfred Georges Oertli, Zürich (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 09/517,261

(22) Filed: Mar. 2, 2000

Related U.S. Application Data

(63) Continuation of application No. 09/033,267, filed on Mar. 2, 1998, now abandoned.

(30) Foreign Application Priority Data

Mar. 6, 1997 (CH) ................................................ 526/97

(51) Int. Cl.⁷ ................................................ C07D 307/83
(52) U.S. Cl. ...................... 549/307; 549/310; 524/482; 528/354; 528/361
(58) Field of Search .................. 549/307, 310; 524/482; 528/354, 361

(56) References Cited

U.S. PATENT DOCUMENTS

| | | | |
|---|---|---|---|
| 2,830,979 | 4/1958 | Goebel et al. | 260/145 |
| 4,263,229 | 4/1981 | Studer et al. | 260/145 |
| 4,325,863 | 4/1982 | Hinsken et al. | 624/111 |
| 4,338,244 | 7/1982 | Hinsken et al. | 524/109 |
| 4,547,566 | 10/1985 | Bergmann et al. | 534/684 |
| 4,638,055 | 1/1987 | Bergmann et al. | 534/678 |
| 4,797,435 | 1/1989 | Scholl et al. | 524/89 |
| 5,104,979 | 4/1992 | Hansen et al. | 534/677 |
| 5,175,312 | 12/1992 | Dubs et al. | 549/307 |
| 5,216,052 | 6/1993 | Nesvadba et al. | 524/108 |
| 5,252,643 | 10/1993 | Nesvadba | 524/111 |
| 5,356,966 | 10/1994 | Nesvadba | 524/111 |
| 5,367,008 | 11/1994 | Nesvadba | 524/111 |
| 5,369,159 | 11/1994 | Nesvadba | 524/111 |
| 5,428,162 | 6/1995 | Nesvadba | 544/221 |
| 5,428,177 | 6/1995 | Nesvadba | 549/304 |
| 5,488,117 | 1/1996 | Nesvadba | 549/302 |
| 5,516,920 | 5/1996 | Nesvadba et al. | 549/307 |
| 5,763,512 | 6/1998 | Schmitter | 524/119 |

FOREIGN PATENT DOCUMENTS

| | | |
|---|---|---|
| 178414 | 10/1935 | (CH) . |
| 2533139 | 2/1976 | (DE) . |
| 3428836 | 2/1985 | (DE) . |
| 0022485 | 1/1981 | (EP) . |
| 0152012 | 8/1985 | (EP) . |
| 0 857 765 | 8/1998 | (EP) . |
| 2311528 | 10/1997 | (GB) . |
| 96/33236 | 10/1996 | (WO) . |

OTHER PUBLICATIONS

Derwent Abstract 85–051367/09 for DE 3428836, Feb. 21, 1985.
Derwent Abstr. 06124 D/05 for EP 0022485, Jan. 21, 1981.
R. Gächter & H. Müller, Plastics Additives Handbook, 3$^{rd}$ Ed., Hanser Publishers, pp. 88–89 (1990).
Derwent Abstr. 76–13363X for DE 2533139, 1976.

*Primary Examiner*—T. A. Solola
(74) *Attorney, Agent, or Firm*—Kevin T. Mansfield

(57) ABSTRACT

This invention relates to compositions comprising a polycarbonate, polyester or polyketone which is subject to oxidative, thermal and/or light-induced degradation, or their mixtures and blends, and at least one benzofuran-2-one type compound, to the use thereof for stabilising polycarbonate, polyester or polyketone or their mixtures or blends against oxidative, thermal and/or light-induced degradation, as well as to a process for stabilising these plastic materials.

11 Claims, No Drawings

STABILIZING POLYCARBONATES

This application is a con of Ser. No. 09/033,267 filed Mar. 2, 1998 now abandoned.

The present invention relates to compositions comprising a polycarbonate, polyester or polyketone which is subject to oxidative, thermal and/or light-induced degradation, or their mixtures and blends, and at least one benzofuran-2-one type compound, to be use thereof for stabilising polycarbonate, polyester or polyketone or their mixtures or blends against oxidative, thermal and/or light-induced degradation, as well as to a process for stabilising these plastic materials.

It is known from, inter alia, R. Gächter and H. Müller, "Plastics Additives Handbook, 3rd Edition", pages 88/89 (1990) that polycarbonates may be protected by suitable stabiliser mixtures, comprising triarylphosphites or phosphonites and certain phenolic antioxidants, against oxidative damage during their preparation, processing and use.

These known stabiliser mixtures do not meet the high demands made on stabiliser mixtures in all respects, in particular as regards storage stability, absorption of water, susceptibility to hydrolysis, processing stabilisation, colour behaviour, transmission properties, volatility, migration behaviour, compatibility and enhancement of light stabilisation. In the case of amorphous plastics, used e.g. as a substitute for glass, discolorations and reduction in transparency are undesirable while processing or using the plastics. In the case of polyesters, in particular PET, which come into contact with beverages, the degradation products of polyester, such as formaldehyde or acetaldehyde, are extremely undesirable because these can affect the taste of the beverages already at low concentrations. There is therefore still a need for effective stabilisers for polycarbonates, polyesters or polyketones or their mixtures or blends which do not substantially reduce the transparency of these plastics on exposure to light or under oxidative or thermal stress and which largely prevent the yellowing of these plastics and the release of degradation products of these plastics.

The use of the compounds of the benzofuran-2-one type as stabilisers for organic polymers, in particular polyolefins, is known, for example, from U.S. Pat. Nos. 4,325,863; 4,388,244; 5,175,312; 5,252,643; 5,216,052; 5,369,159; 5,488,117; 5,356,966; 5,367,008; 5,428,162; 5,428,177 or U.S. Pat. No. 5,516,920.

It has now been found that these benzofuran-2-one type compounds are particularly suitable as stabilisers for polycarbonates, polyesters or polyketones or their mixtures or blends.

Accordingly, this invention relates to compositions comprising
a) a polycarbonate, polyester or polyketone which is subject to oxidative, thermal and/or light-induced degradation, or their mixtures or blends, and
b) at least one benzofuran-2-one type compound.

Interesting compositions are those, wherein component (b) is a compound of formula I

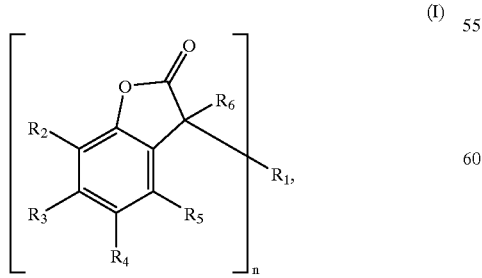

(I)

wherein,
if n=1, $R_1$ is naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pyridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl, each of which is unsubstituted or substituted by $C_1$–$C_4$alkyl, $C_1$–$C_4$alkoxy, $C_1$–$C_4$alkylthio, hydroxy, halogen, amino, $C_1$–$C_4$alkylamino, phenylamino or di($C_1$–$C_4$-alkyl)amino, or $R_1$ is a radical of formula II

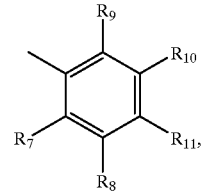

(II)

and,
if n=2, $R_1$ is unsubstituted or $C_1$–$C_4$alkyl- or hydroxy-substituted phenylene or naphthylene; or —$R_{12}$—X—$R_{13}$—, $R_2$, $R_3$, $R_4$ and $R_5$ are each independently of one another hydrogen, chloro, hydroxy, $C_1$–$C_{25}$alkyl, $C_7$–$C_9$phenylalkyl, unsubstituted or $C_1$–$C_4$alkyl-substituted phenyl; unsubstituted or $C_1$–$C_4$alkyl-substituted $C_5$–$C_8$cycloalkyl; $C_1$–$C_{18}$alkoxy, $C_1$–$C_{18}$alkylthio, $C_1$–$C_4$alkylamino, di($C_1$–$C_4$-alkyl)amino, $C_1$–$C_{25}$alkanoyloxy, $C_1$–$C_{25}$alkanoylamino, $C_3$–$C_{25}$alkenoyloxy; $C_3$–$C_{25}$alkanoyloxy which is interrupted by oxygen, sulfur or

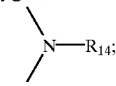

$C_6$–$C_9$cycloalkyl-carbonyloxy, benzoyloxy or $C_1$–$C_{12}$alkyl-substituted benzoyloxy; or $R_2$ and $R_3$, or $R_3$ and $R_4$, or $R_4$ and $R_5$, together with the linking carbon atoms, form a benzene ring, $R_4$ is additionally —$(CH_2)_p$—$COR_{15}$ or —$(CH_2)_q$OH or, if $R_3$, $R_5$ and $R_6$ are hydrogen, $R_4$ is additionally a radical of formula III

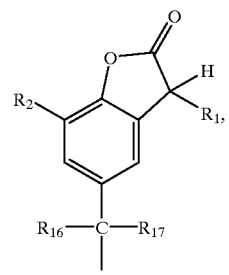

(III)

wherein
$R_1$ is as defined above for n=1, $R_6$ is hydrogen or a radical of formula IV

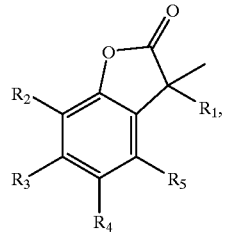
(IV)

wherein $R_4$ is not a radical of formula III, and $R_1$ is as defined above for n=1, $R_7$, $R_8$, $R_9$, $R_{10}$ and $R_{11}$ are each independently of one another hydrogen, halogen, hydroxy, $C_1-C_{25}$alkyl; $C_2-C_{25}$alkyl which is interrupted by oxygen, sulfur or

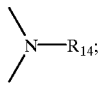

$C_1-C_{25}$alkoxy; $C_2-C_{25}$alkoxy which is interrupted by oxygen, sulfur or

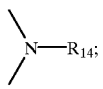

$C_1-C_{25}$alkylthio $C_3-C_{25}$-alkenyl, $C_3-C_{25}$alkenyloxy, $C_3-C_{25}$alkynyl, $C_3-C_{25}$alkynyloxy, $C_7-C_9$phenylalkyl, $C_7-C_9$phenylalkoxy, unsubstituted or $C_1-C_4$alkyl-substituted phenyl; unsubstituted or $C_1-C_4$alkyl-substituted phenoxy; unsubstituted or $C_1-C_4$alkyl-substituted $C_5-C_8$cycloalkyl; unsubstituted or $C_1-C_4$alkyl-substituted $C_5-C_8$cycloalkoxy; $C_1-C_4$alkylamino, di($C_1-C_4$alkyl)amino, $C_1-C_{25}$alkanoyl; $C_3-C_{25}$alkanoyl which is interrupted by oxygen, sulfur or

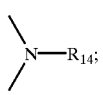

$C_1-C_{25}$alkanoyloxy; $C_3-C_{25}$alkanoyloxy which is interrupted by oxygen, sulfur or

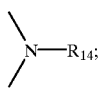

$C_1-C_{25}$ alkanoylamino, $C_3-C_{25}$alkenoyl; $C_3-C_{25}$alkenoyl which is interrupted by oxygen, sulfur or

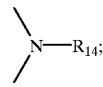

$C_3-C_{25}$alkenoyloxy; $C_3-C_{25}$alkenoyloxy which is interrupted by oxygen, sulfur or

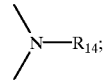

$C_6-C_9$cycloalkylcarbonyl, $C_6-C_9$cycloalkylcarbonyloxy, benzoyl or $C_1-C_{12}$alkyl-substituted benzoyl; benzoyloxy or $C_1-C_{12}$alkyl-substituted benzoyloxy;

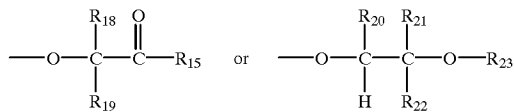

or, in formula II, $R_7$ and $R_8$, or $R_8$ and $R_{11}$, together with the linking carbon atoms, form a benzene ring, $R_{12}$ and $R_{13}$ are each independently of the other unsubstituted or $C_1-C_4$alkyl-substituted phenylene or naphthylene, ($R_{14}$ is hydrogen or $C_1-C_8$alkyl, $R_{15}$ is hydroxy,

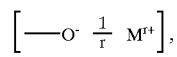

$C_1-C_{18}$alkoxy or

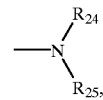

$R_{16}$ and $R_{17}$ are each independently of the other hydrogen, $CF_3$, $C_1-C_{12}$alkyl or phenyl, or $R_{16}$ and $R_{17}$, together with the linking carbon atom, are a $C_5-C_8$cycloalkylidene ring which is unsubstituted or substituted by 1 to 3 $C_1-C_4$alkyl;

$R_{18}$ and $R_{19}$ are each independently of the other hydrogen, $C_1-C_4$alkyl or phenyl, $R_{20}$ is hydrogen or $C_1-C_4$alkyl, $R_{21}$ is hydrogen, unsubstituted or $C_1-C_4$alkyl-substituted phenyl; $C_1-C_{25}$alkyl; $C_2-C_{25}$alkyl which is interrupted by oxygen, sulfur or

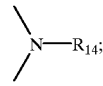

$C_7-C_9$phenylalkyl which is unsubstituted or substituted at the phenyl moiety by 1 to 3 $C_1-C_4$alkyl; $C_7-C_{25}$phenylalkyl which is interrupted by oxygen, sulfur or

and which is unsubstituted or substituted at the phenyl moiety by 1 to 3 $C_1$–$C_4$alkyl, or $R_{20}$ and $R_{21}$, together with the linking carbon atoms, form a $C_5$–$C_{12}$cycloalkylene ring which is unsubstituted or substituted by 1 to 3 $C_1$–$C_4$alkyl;

$R_{22}$ is hydrogen or $C_1$–$C_4$alkyl, $R_{23}$ is hydrogen, $C_1$–$C_{25}$alkanoyl, $C_3$–$C_{25}$alkenoyl; $C_3$–$C_{25}$alkanoyl which is interrupted by oxygen, sulfur or

$C_2$–$C_{25}$alkanoyl which is substituted by a di($C_1$–$C_6$alkyl)phosphonate group; $C_6$–$C_9$cycloalkylcarbonyl, thenoyl, furoyl, benzoyl or $C_1$–$C_{12}$alkyl-substituted benzoyl;

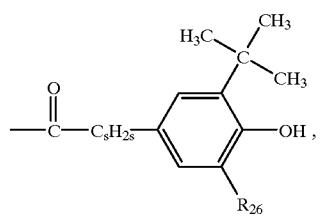

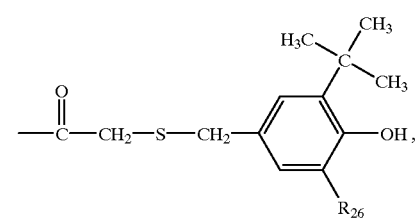

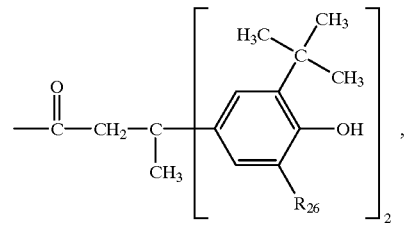

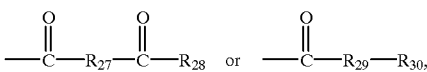

$R_{24}$ and $R_{25}$ are each independently of the other hydrogen or $C_1$–$C_{18}$alkyl, $R_{26}$ is hydrogen or $C_1$–$C_8$alkyl, $R_{27}$ is a direct bond, $C_1$–$C_{18}$alkylene; $C_2$–$C_{18}$alkylene which is interrupted by oxygen, sulfur or

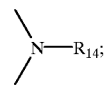

$C_2$–$C_{18}$alkenylene, $C_2$–$C_{20}$alkylidene, $C_7$–$C_{20}$phenylalkylidene, $C_5$–$C_8$cycloalkylene, $C_7$–$C_8$bicycloalkylene, unsubstituted or $C_1$–$C_4$alkyl-substituted phenylene,

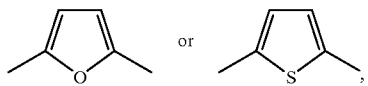

$R_{28}$ is hydroxy,

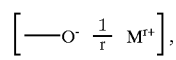

$C_1$–$C_{18}$alkoxy or

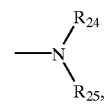

$R_{29}$ is oxygen, —NH— or

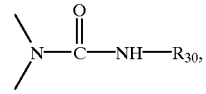

$R_{30}$ is $C_1$–$C_{18}$alkyl or phenyl,
$R_{31}$ is hydrogen or $C_1$–$C_{18}$alkyl,
M is an r-valent metal cation,
X is a direct bond, oxygen, sulfur or —$NR_{31}$—,
n is 1 or 2,
p is 0, 1 or 2,
q is 1, 2, 3, 4, 5 or 6,
r is 1, 2 or 3, and
s is 0, 1 or 2.

Naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl, each of which is unsubstituted or substituted by $C_1$–$C_4$alkyl, $C_1$–$C_4$alkoxy, $C_1$–$C_4$alkylthio, hydroxy, halogen, amino, $C_1$–$C_4$alkylamino, phenylamino or di($C_1$–$C_4$alkyl)amino are, for example, 1-naphthyl, 2-naphthyl, 1-phenylamino-4-naphthyl, 1-methylnaphthyl, 2-methylnaphthyl, 1-methoxy-2-naphthyl, 2-methoxy-1-naphthyl, 1dimethylamino-2-naphthyl, 1,2-dimethyl-4-naphthyl, 1,2-dimethyl-6-naphthyl, 1,2-dimethyl-7-naphthyl, 1,3-dimethyl-6-naphthyl, 1,4-dimethyl-6-naphthyl, 1,5-dimethyl-2-naphthyl, 1,6-dimethyl-2- naphthyl, 1-hydroxy-2-naphthyl, 2-hydroxy-1-naphthyl, 1,4-dihydroxy-2-naphthyl, 7-phenanthryl, 1-anthryl, 2-anthryl, 9-anthryl, 3-benzo[b]thienyl, 5-benzo[b]thienyl, 2-benzo[b]thienyl, 4-dibenzofuryl, 4,7dibenzofuryl, 4-methyl-7-dibenzofuryl, 2-xanthenyl, 8-methyl-2-xanthenyl, 3-xanthenyl, 2-phenoxathiinyl, 2,7-phenoxathiinyl, 2-pyrrolyl, 3-pyrrolyl, 5-methyl-3-pyrrolyl, 2-imidazolyl, 4-imidazolyl, 5-imidazolyl, 2-methyl-4-imidazolyl, 2-ethyl-4-imidazolyl, 2-ethyl-5-imidazolyl, 3-pyrazolyl, 1-methyl-3-pyrazolyl, 1-propyl-4-pyrazolyl, 2-pyrazinyl, 5,6-dimethyl-2-pyrazinyl, 2-indolizinyl, 2-methyl-3-isoindolyl, 2-methyl-1-isoindolyl, 1-methyl-2-indolyl, 1-methyl-3-indolyl, 1,5-dimethyl-2-indolyl, 1-methyl-3-indazolyl, 2,7-dimethyl-8-purinyl, 2-methoxy-7-methyl-8-purinyl, 2-quinolizinyl, 3-isoquinolyl, 6-isoquinolyl, 7-isoquinolyl, isoquinolyl, 3-methoxy-6-isoquinolyl, 2-quinolyl, 6-quinolyl, 7-quinolyl, 2-methoxy-3-quinolyl, 2-methoxy-6-quinolyl, 6-phthalazinyl, 7-phthalazinyl, 1-methoxy-6-phthalazinyl, 1,4-dimethoxy-6-phthalazinyl, 1,8-naphthyridin-2-yl, 2-quinoxalinyl, 6-quinoxalinyl, 2,3-dimethyl-6-quinoxalinyl, 2,3-dimethoxy-6quinoxalinyl, 2quinazolinyl, 7-quinazolinyl, 2-dimethylamino-6-quinazolinyl, 3-cinnolinyl, 6-cinnolinyl, 7-cinnolinyl, 3-methoxy-7-cinnolinyl, 2-pteridinyl, 6-pteridinyl, 7-pteridinyl, 6,7-dimethoxy-2-pteridinyl, 2-carbazolyl, 3-carbazolyl, 9-methyl-2-carbazolyl, 9-methyl-3-carbazolyl, β-carbolin-3-yl, 1-methyl-β-carbolin-3-yl, 1-methyl-β-carbolin-6-yl, 3-phenanthridinyl, 2-acridinyl, 3-acridinyl, 2-perimidinyl, 1-methyl-5-perimidinyl, 5-phenanthrolinyl, 6-phenanthrolinyl, 1-phenazinyl, 2-phenazinyl, 3-isothiazolyl, 4-isothiazolyl, 5-isothiazolyl, 2-phenothiazinyl, 3-phenothiazinyl, 10-methyl-3-phenothiazinyl, 3-isoxazolyl, 4-isoxazolyl, 5-isoxazolyl, 4-methyl-3-furazanyl, 2-phenoxazinyl or 10-methyl-2-phenoxazinyl.

Particularly preferred are naphthyl, phenanthryl, anthryl, 5,6,7,8-tetrahydro-2-naphthyl, 5,6,7,8tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, isoindolyl, indolyl, phenothiazinyl, biphenyl, terphenyl, fluorenyl or phenoxazinyl, each of which is unsubstituted or substituted by $C_1$–$C_4$alkyl, $C_1$–$C_4$alkoxy, $C_1$–$C_4$alkylthio, hydroxy, phenylamino or di($C_1$–$C_4$-alkyl)amino, for example 1-naphthyl, 2-naphthyl, 1-phenylamino-4-naphthyl, 1-methylnaphthyl, 2-methylnaphthyl, 1-methoxy-2-naphthyl, 2-methoxy-1-naphthyl, 1-dimethylamino-2-naphthyl, 1,2-dimethyl-4-naphthyl, 1,2-dimethyl-6-naphthyl, 1,2-dimethyl-7-naphthyl, 1,3-dimethyl-6-naphthyl, 1,4-dimethyl-6-naphthyl, 1,5-dimethyl-2-naphthyl, 1,6-dimethyl-2-naphthyl, 1-hydroxy-2-naphthyl, 2-hydroxy-1-naphthyl, 1,4-dihydroxy-2-naphthyl, 7-phenanthryl, 1-anthryl, 2-anthryl, 9-anthryl, 3-benzo[b]thienyl, 5-benzo[b]thienyl, 2-benzo[b]thienyl, 4-dibenzofuryl, 4,7-dibenzofuryl, 4-methyl-7-dibenzofuryl, 2-xanthenyl, 8-methyl-2-xanthenyl, 3-xanthenyl, 2-pyrrolyl, 3-pyrrolyl, 2-phenothiazinyl, 3-phenothiazinyl, 10-methyl-3-phenothiazinyl.

Halogen is typically chloro, bromo or iodo. Chloro is preferred.

Alkanoyl of up to 25 carbon atoms is a branched or unbranched radical, typically formyl, acetyl, propionyl, butanoyl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, eicosanoyl or docosanoyl. Alkanoyl of 2 to 18, in particular of 2 to 12, e.g. of 2 to 6, carbon atoms is preferred. Acetyl is particularly preferred.

$C_2$–$C_{25}$Alkanoyl which is substituted by a di($C_1$–$C_6$alkyl) phosphonate group is typically $(CH_3CH_2O)_2POCH_2CO$—, $(CH_3O)_2POCH_2CO$—, $(CH_3CH_2CH_2CH_2O)_2POCH_2CO$—, $(CH_3CH_2O)_2POCH_2CH_2CO$—, $(CH_3O)_2POCH_2CH_2CO$—, $(CH_3CH_2CH_2CH_2O)_2POCH_2CH_2CO$—, $(CH_3CH_2O)_2PO(CH_2)_4CO$—, $(CH_3CH_2O)_2PO(CH_2)_8CO$— or $(CH_3CH_2O)_2PO(CH_2)_{17}CO$—.

Alkanoyloxy of up to 25 carbon atoms is a branched or unbranched radical, typically formyloxy, acetoxy, propionyloxy, butanoyloxy, pentanoyloxy, hexanoyloxy, heptanoyloxy, octanoyloxy, nonanoyloxy, decanoyloxy, undecanoyloxy, dodecanoyloxy, tridecanoyloxy, tetradecanoyloxy, pentadecanoyloxy, hexadecanoyloxy, heptadecanoyloxy, octadecanoyloxy, eicosanoyloxy or docosanoyloxy. Alkanoyloxy of 2 to 18, in particular of 2 to 12, e.g. of 2 to 6, carbon atoms is preferred. Acetoxy is particularly preferred.

Alkenoyl of 3 to 25 carbon atoms is a branched or unbranched radical, typically propenyloxy, 2-butenoyl, 3-butenoyl, isobutenoyl, n-2,4-pentadienoyl, 3-methyl-2-butenoyl, n-2-octenoyl, n-2-dodecenoyl, isododecenoyl, oleoyl, n-2-octadecenoyl or n-4-octadecenoyl. Alkenoyl of 3 to 18, preferably of 3 to 12, e.g. of 3 to 6, most preferably of 3 to 4, carbon atoms is preferred.

$C_3$–$C_{25}$Alkenoyl which is interrupted by oxygen, sulfur or

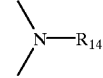

is typically $CH_3OCH_2CH_2CH=CHCO$— or $CH_3OCH_2CH_2OCH=CHCO$—.

Alkenoyloxy of 3 to 25 carbon atoms is a branched or unbranched radical, typically propenoyloxy, 2-butenoyloxy, 3-butenoyloxy, isobutenoyloxy, n-2,4-pentadienoyloxy, 3-methyl-2-butenoyloxy, n-2-octenoyloxy, n-2-dodecenoyloxy, isododecenoyloxy, oleoyloxy, n-2-octadecenoyloxy or n-4octadecenoyloxy. Alkenoyloxy of 3 to 18, preferably of 3 to 12, e.g. of 3 to 6, most preferably of 3 to 4, carbon atoms is preferred.

$C_3$–$C_{25}$Alkenoyloxy which is interrupted by oxygen, sulfur or

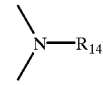

is typically $CH_3OCH_2CH_2CH=CHCOO$— or $CH_3OCH_2CH_2OCH=CHCOO$—.

$C_3$–$C_{25}$Alkanoyl which is interrupted by oxygen, sulfur or

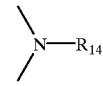

is typically $CH_3$—O—$CH_2CO$—, $CH_3$—S—$CH_2CO$—, $CH_3$—NH—$CH_2CO$—, $CH_3$—N($CH_3$)—$CH_2CO$—, $CH_3$—O—$CH_2CH_2$—O—$CH_2CO$—, $CH_3$—(O—$CH_2CH_2$—)$_2$O—$CH_2CO$—, $CH_3$—(O—$CH_2CH_2$—)$_3$O—$CH_2CO$— or $CH_3$—(O—$CH_2CH_2$—)$_4$O—$CH_2CO$—.

$C_3$–$C_2$Alkanoyloxy which is interrupted by oxygen, sulfur or

is typically CH₃—O—CH₂COO—, CH₃—S—CH₂COO—, CH₃—NH—CH₂COO—, CH₃—N(CH₃)—CH₂COO—, CH₃—O—CH₂CH₂—O—CH₂COO—, CH₃—(O—CH₂CH₂—)₂O—CH₂COO—, CH₃—(O—CH₂CH₂—)₃O—CH₂COO— or CH₃—(O—CH₂CH₂—)₄O—CH₂COO—.

$C_6$–$C_9$Cycloalkylcarbonyl is typically cyclohexylcarbonyl, cycloheptylcarbonyl or cyclooctylcarbonyl. Cyclohexylcarbonyl is preferred.

$C_6$–$C_9$Cycloalkylcarbonyloxy is typically cyclohexylcarbonyloxy, cycloheptylcarbonyloxy or cyclooctylcarbonyloxy. Cyclohexylcarbonyloxy is preferred.

$C_1$–$C_{12}$Alkyl-substituted benzoyl which preferably carries 1 to 3, more preferably 1 or 2, alkyl groups is typically o-, m- or p-methylbenzoyl, 2,3-dimethylbenzoyl, 2,4-dimethylbenzoyl, 2,5-dimethylbenzoyl, 2,6-dimethylbenzoyl, 3,4-dimethylbenzoyl, 3,5-dimethylbenzoyl, 2-methyl-6-ethylbenzoyl, 4-tert-butylbenzoyl, 2-ethylbenzoyl, 2,4,6-trimethylbenzoyl, 2,6-dimethyl-4-tert-butylbenzoyl or 3,5-di-tert-butylbenzoyl. Preferred substituents are $C_1$–$C_8$alkyl, in particular $C_1$–$C_4$alkyl.

$C_1$–$C_{12}$Alkyl-substituted benzoyloxy which preferably carries 1 to 3, more preferably 1 or 2, alkyl groups is typically o-, m- or p-methylbenzoyloxy, 2,3-dimethylbenzoyloxy, 2,4-dimethylbenzoyloxy, 2,5-dimethylbenzoyloxy, 2,6-dimethylbenzoyloxy, 3,4-dimethylbenzoyloxy, 3,5-dimethylbenzoyloxy, 2-methyl-6-ethylbenzoyloxy, 4-tert-butylbenzoyloxy, 2-ethylbenzoyloxy, 2,4,6-trimethylbenzoyloxy, 2,6-dimethy-4-tert-butylbenzoyloxy or 3,5-di-tert-butylbenzoyloxy. Preferred substituents are $C_1$–$C_8$alkyl, in particular $C_1$–$C_4$alkyl.

Alkyl of up to 25 carbon atoms is a branched or unbranched radical, such as methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred meanings of $R_2$ and $R_4$ is, for example, $C_1$–$C_{18}$alkyl. A particularly preferred meaning of $R_4$ is $C_1$–$C_4$alkyl.

Alkenyl of 3 to 25 carbon atoms is a branched or unbranched radical, such as propenyl, 2-butenyl, 3-butenyl, isobutenyl, n-2,4-pentadienyl, 3-methyl-2-butenyl, n-2-octenyl, n-2-dodecenyl, isododecenyl, oleyl, n-2-octadecenyl or n-4-octadecenyl. Alkenyl of 3 to 18, preferably of 3 to 12, e.g. of 3 to 6, in particular of 3 to 4, carbon atoms is preferred.

Alkenyloxy of 3 to 25 carbon atoms is a branched or unbranched radical, such as propenyloxy, 2-butenyloxy, 3-butenyloxy, isobutenyloxy, n-2,4-pentadienyloxy, 3-methyl-2-butenyloxy, n-2-octenyloxy, n-2-dodecenyloxy, isododecenyloxy, oleyloxy, n-2-octadecenyloxy or n-4-octadecenyloxy. Alkenyloxy of 3 to 18, preferably of 3 to 12, e.g. of 3 to 6, in particular of 3 to 4, carbon atoms is preferred.

Alkynyl of 3 to 25 carbon atoms is a branched or unbranched radical, such as propynyl (—CH₂—C≡CH), 2-butynyl, 3-butynyl, n-2-octynyl, or n-2-dodecynyl. Alkynyl of 3 to 18, preferably of 3 to 12, e.g. of 3 to 6, in particular of 3 to 4 carbon atoms is preferred.

Alkynyloxy of 3 to 25 carbon atoms is a branched or unbranched radical, such propynyloxy (—OCH₂—C≡CH) 2-butynyloxy, 3-butynyloxy, n-2-octynyloxy, or n-2-dodecynyloxy.

Alkynyloxy of 3 to 18, preferably of 3 to 12, e.g. of 3 to 6, in particular of 3 to 4, carbon atoms is preferred.

$C_2$–$C_{25}$Alkyl which is interrupted by oxygen, sulfur or

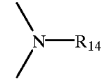

is typically CH₃—O—CH₂—, CH₃—S—CH₂—, CH₃—NH—CH₂—, CH₃—N(CH₃)—CH₂—, CH₃—O—CH₂CH₂—O—CH₂—, CH₃—(O—CH₂CH₂—)₂—O—CH₂—, CH₃—(O—CH₂CH₂—)₃O—CH₂— or CH₃—(O—CH₂Ch₂—)₄O—CH₂—.

$C_7$–$C_9$Phenylalkyl is typically benzyl, α-methylbenzyl, α,α-dimethylbenzyl or 2-phenylethyl. Benzyl and α,α-dimethylbenzyl are preferred.

$C_7$–$C_9$Phenylalkyl which is unsubstituted or substituted at the phenyl moiety by 1 to 3 $C_1$–$C_4$alkyl is typically benzyl, α-methylbenzyl, α,α-dimethylbenzyl, 2-phenylethyl, 2-methylbenzyl, 3-methylbenzyl, 4-methylbenzyl, 2,4-dimethylbenzyl, 2,6-dimethylbenzyl or 4tert-butylbenzyl. Benzyl is preferred.

$C_7$–$C_{25}$Phenylalkyl which is interrupted by oxygen, sulfur or

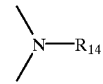

and which is unsubstituted or substituted at the phenyl moiety by 1 to 3 $C_1$–$C_4$alkyl is a branched or unbranched radical, such as phenoxymethyl, 2-methylphenoxymethyl, 3-methyl-phenoxymethyl, 4-methylphenoxymethyl, 2,4-dimethylphenoxymethyl, 2,3-dimethylphenoxymethyl, phenylthiomethyl, N-methyl-N-phenyl-methyl, N-ethyl-N-phenylmethyl, 4-tert-butylphenoxymethyl, 4-tert-butylphenoxyethoxymethyl, 2,4-di-tert-butylphenoxymethyl, 2,4-di-tert-butylphenoxyethoxymethyl, phenoxyethoxyethoxyethoxymethyl, benzyloxymethyl, benzyloxyethoxymethyl, N-benzyl-N-ethylmethyl or N-benzyl-N-isopropylmethyl.

$C_7$–$C_9$Phenylalkoxy is typically benzyloxy, α-methylbenzyloxy, α,α-dimethylbenzyloxy or 2-phenylethoxy. Benzyloxy is preferred.

$C_1$–$C_4$Alkyl-substituted phenyl which preferably contains 1 to 3, in particular 1 or 2, alkyl groups is typically o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_1$–$C_4$Alkyl-substituted phenoxy which preferably contains 1 to 3, in particular 1 or 2, alkyl groups is typically o-, m- or p-methylphenoxy, 2,3-dimethylphenoxy, 2,4-dimethylphenoxy, 2,5-dimethylphenoxy, 2,6- dimethylphenoxy, 3,4-dimethylphenoxy, 3,5-dimethylphenoxy, 2-methyl-6-ethylphenoxy, 4tert-butylphenoxy, 2-ethylphenoxy or 2,6-diethylphenoxy.

Unsubstituted or $C_1$–$C_4$alkyl-substituted $C_5$–$C_8$cycloalkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl. Cyclohexyl and tert-butylcyclohexyl are preferred.

Unsubstituted or $C_1$–$C_4$alkyl-substituted $C_5$–$C_8$cycloalkoxy is, for example, cyclopentoxy, methylcyclopentoxy, dimethylcyclopentoxy, cyclohexoxy, methylcyclohexoxy, dimethylcyclohexoxy, trimethylcyclohexoxy, tert-butylcyclohexoxy, cycloheptoxy or cyclooctoxy. Cyclohexoxy and tert-butylcyclohexoxy are preferred.

Alkoxy of up to 25 carbon atoms is a branched or unbranched radical, such as methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. Alkoxy of 1 to 12, in particular of 1 to 8, e.g. of 1 to 6, carbon atoms is preferred.

$C_2$–$C_{25}$Alkoxy which is interrupted by oxygen, sulfur or

is typically
CH$_3$—O—CH$_2$CH$_2$O—, CH$_3$—S—CH$_2$CH$_2$O—, CH$_3$—NH—CH$_2$O—, CH$_3$—N(CH$_3$)—CH$_2$CH$_2$O—, CH$_3$—O—CH$_2$CH$_2$—O—CH$_2$CH$_2$O—, CH$_3$—(O—CH$_2$CH$_2$—)$_2$O—CH$_2$CH$_2$O—, CH$_3$—(O—CH$_2$CH$_2$—)$_3$O—CH$_2$CH$_2$O— or CH$_3$—(O—CH$_2$CH$_2$—)$_4$O—CH$_2$CH$_2$O—.

Alkylthio of up to 25 carbon atoms is a branched or unbranched radical, such as methylthio, ethylthio, propylthio, isopropylthio, n-butylthio, isobutylthio, pentylthio, isopentylthio, hexylthio, heptylthio, octylthio, decylthio, tetradecylthio, hexadecylthio or octadecylthio. Alkylthio of 1 to 12, in particular of 1 to 8, e.g. of 1 to 6 carbon atoms is preferred.

Alkylamino of up to 4 carbon atoms is a branched or unbranched radical, such as methyl-amino, ethylamino, propylamino, isopropylamino, n-butylamino, isobutylamino or tert-butyl-amino.

Di($C_1$–$C_4$alkyl)amino also means that the two radicals are independently of the other branched or unbranched, such as dimethylamino, methylethylamino, diethylamino, methyl-n-propylamino, methylisopropylamino, methyl-n-butylamino, methylisobutylamino, ethylisopropylamino, ethyl-n-butylamino, ethylisobutylamino, ethyl-tert-butylamino, diethylamino, diisopropylamino, isopropyl-n-butylamino, isopropylisobutylamino, di-n-butylamino or di-isobutylamino.

Alkanoylamino of up to 25 carbon atoms is a branched or unbranched radical, such as formylamino, acetylamino, propionylamino, butanoylamino, pentanoylamino, hexanoylamino, heptanoylamino, octanoylamino, nonanoylamino, decanoylamino, undecanoylamino, dodecanoylamino, tridecanoylamino, tetradecanoylamino, pentadecanoylamino, hexadecanoylamino, heptadecanoylamino, octadecanoyamino, eicosanoylamino or docsanoylamino. Alkanoylamino of 2 to 18, in particular of 2 to 12, e.g. 2 to 6 carbon atoms is preferred.

$C_1$–$C_{18}$Alkylene is a branched or unbranched radical, such as methylene, ethylene, propylene, trimethylene, tetramethylene, pentamethylene, hexamethylene, heptamethylene, octamethylene, decamethylene, dodecamethylene or octadecamethylene. $C_1$–$C_{12}$Alkylene and, in particular, $C_1$–$C_8$alkylene are preferred.

A $C_1$–$C_4$Alkyl-substituted $C_5$–$C_{12}$cycloalkylene ring which preferably contains 1 to 3, in particular 1 or 2, branched or unbranched alkyl groups is typically cyclopentylene, methylcyclopentylene, dimethylcyclopentylene, cyclohexylene, methylcyclohexylene, dimethylcyclohexylene, trimethylcyclohexylene, tert-butylcyclohexylene, cycloheptylene, cyclooctylene or cyclodecylene. Cyclohexylene and tert-butylcyclohexylene are preferred.

$C_2$–$C_{18}$Alkylene which is interrupted by oxygen, sulfur or

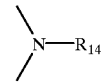

is, for example,
—CH$_2$—O—CH$_2$—, —CH$_2$—S—CH$_2$—, —CH$_2$—NH—CH$_2$—, —CH$_2$—N(CH$_3$)—CH$_2$—, —CH$_2$—O—CH$_2$CH$_2$—O—CH$_2$—, —CH$_2$—(O—CH$_2$CH$_2$—)$_2$O—CH$_2$—, —CH$_2$—(O—CH$_2$CH$_2$—)$_3$O—CH$_2$—, —CH$_2$—(O—CH$_2$CH$_2$—)$_4$O—CH$_2$— or —CH$_2$CH$_2$—S—CH$_2$CH$_2$—.

$C_2$–$C_{18}$Alkenylene is typically vinylene, methylvinylene, octenylethylene or dodecenylethylene. $C_2$–$C_8$Alkenylene is preferred.

Alkylidene of 2 to 20 carbon atoms is, for example, ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene. $C_2$–$C_8$Alkylidene is preferred.

Phenylalkylidene of 7 to 20 carbon atoms is typically benzylidene, 2-phenylethylidene or 1-phenyl-2-hexylidene. $C_7$–$C_9$Phenylalkylidene is preferred.

$C_5$–$C_8$Cycloalkylene is a saturated hydrocarbon group having two free valencies and at least one ring unit and is typically cyclopentylene, cyclohexylene, cycloheptylene or cyclooctylene. Cyclohexylene is preferred.

$C_7$–$C_8$Bicycloalkylene is typically bicycloheptylene or bicyclooctylene.

Unsubstituted or $C_1$–$C_4$alkyl-substituted phenylene or naphthylene is typically 1,2-, 1,3-, 1,4-phenylene, 1,2-, 1,3-, 1,4-, 1,6-, 1,7-, 2,6- or 2,7-naphthylene. 1,4-Phenylene is preferred.

A $C_1$–$C_4$Alkyl-substituted $C_5$–$C_8$cycloalkylidene ring which preferably contains 1 to 3, in particular 1 or 2, branched or unbranched alkyl groups is typically cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene or cyclooctylidene. Cyclohexylidene and tert-butylcyclohexylidene are preferred.

A mono-, di- or tri-valent metal cation is preferably an alkali metal cation, alkaline earth metal cation or aluminium cation, typically Na$^+$, K$^+$, Mg$^{++}$, Ca$^{++}$ or Al$^{+++}$.

Interesting compositions are those containing as component (b) at least one compound of formula I, wherein, if n=1, $R_1$ is phenyl which is unsubstituted or substituted in para-position by $C_1$–$C_{18}$alkylthio or di($C_1$–$C_4$-alkyl)amino;

mono- to penta-substituted alkylphenyl containing together a total of at most 18 carbon atoms in the 1 to 5 alkyl substituents; naphthyl, biphenyl, terphenyl, phenanthryl, anthryl, fluorenyl, carbazolyl, thienyl, pyrrolyl, phenothiazinyl or 5,6,7,8-tetrahydronaphthyl which are unsubstituted or substituted by $C_1$–$C_4$-alkyl, $C_1$–$C_4$alkoxy, $C_1$–$C_4$alkylthio, hydroxy or amino.

Preferred compositions are those containing as component (b) at least one compound of formula I, wherein, if n=2, $R_1$ is —$R_{12}$—X—$R_{13}$—, $R_{12}$ and $R_{13}$ are phenylene, X is oxygen or —$NR_{31}$—, and $R_{31}$ is $C_1$–$C_4$alkyl.

Other preferred compositions are those containing as component (b) at least one compound of formula I, wherein, if n=1, $R_1$ is naphthyl, phenanthryl, thienyl, dibenzofuryl, carbazolyl, fluorenyl which are unsubstituted or substituted by $C_1$–$C_4$alkyl, $C_1$–$C_4$alkoxy, $C_1$–$C_4$alkylthio, hydroxy, halogen, amino, $C_1$–$C_4$alkylamino or di($C_1$–$C_4$-alkyl)amino, or a radical of formula II (II)

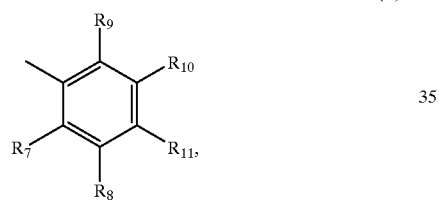

$R_7$, $R_8$, $R_9$, $R_{10}$ and $R_{11}$ are each independently of one another hydrogen, chloro, bromo, hydroxy, $C_1$–$C_{18}$alkyl; $C_2$–$C_{18}$alkyl which is interrupted by oxygen or sulfur; $C_1$–$C_{18}$alkoxy; $C_2$–$C_{18}$alkoxy which is interrupted by oxygen or sulfur; $C_1$–$C_{18}$alkylthio, $C_3$–$C_{12}$alkenyloxy, $C_3$–$C_{12}$-alkynyloxy, $C_7$–$C_9$phenylalkyl, $C_7$–$C_9$phenylalkoxy, unsubstituted or $C_1$–$C_4$alkyl-substituted phenyl; phenoxy, cyclohexyl, $C_5$–$C_8$cycloalkoxy, $C_1$–$C_4$alkylamino, di($C_1$–$C_4$alkyl)amino, $C_1$–$C_{12}$alkanoyl; $C_3$–$C_{12}$alkanoyl which is interrupted by oxygen or sulfur; $C_1$–$C_{12}$alkanoyloxy; $C_3$–$C_{12}$alkanoyloxy which is interrupted by oxygen or sulfur; $C_1$–$C_{12}$alkanoylamino, $C_3$–$C_{12}$-alkenoyl, $C_3$–$C_{12}$alkenoyloxy, cyclohexylcarbonyl, cyclohexylcarbonyloxy, benzoyl or $C_1$–$C_4$alkyl-substituted benzoyl; benzoyloxy or $C_1$–$C_4$alkyl-substituted benzoyloxy;

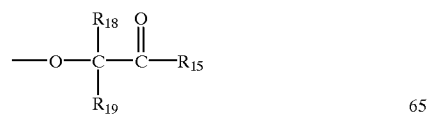

or

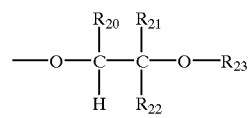

or, in formula II, $R_7$ and $R_8$, or $R_8$ and $R_{11}$, together with the linking carbon atoms, form a benzene ring, $R_{15}$ is hydroxy, $C_1$–$C_{12}$alkoxy or

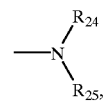

$R_{18}$ and $R_{19}$ are each independently of the other hydrogen or $C_1$–$C_4$alkyl, $R_{20}$ is hydrogen, $R_{21}$ is hydrogen, phenyl, $C_1$–$C_{18}$alkyl; $C_2$–$C_{18}$alkyl which is interrupted by oxygen or sulfur; $C_7$–$C_9$phenylalkyl; $C_7$–$C_{18}$phenylalkyl which is interrupted by oxygen or sulfur and which is unsubstituted or substituted at the phenyl moiety by 1 to 3 $C_1$–$C_4$alkyl, or $R_{20}$ and $R_{21}$, together with the linking carbon atoms, form a cyclohexylene ring which is unsubstituted or substituted by 1 to 3 $C_1$–$C_4$alkyl, $R_{22}$ is hydrogen or $C_1$–$C_4$alkyl, $R_{23}$ is hydrogen, $C_1$–$C_{18}$alkanoyl, $C_3$–$C_{18}$alkenoyl; $C_3$–$C_{12}$alkanoyl which is interrupted by oxygen or sulfur; $C_2$–$C_{12}$alkanoyl which is substituted by a di($C_1$–$C_6$alkyl)phosphonate group; $C_6$–$C_9$cycloalkylcarbonyl, benzoyl,

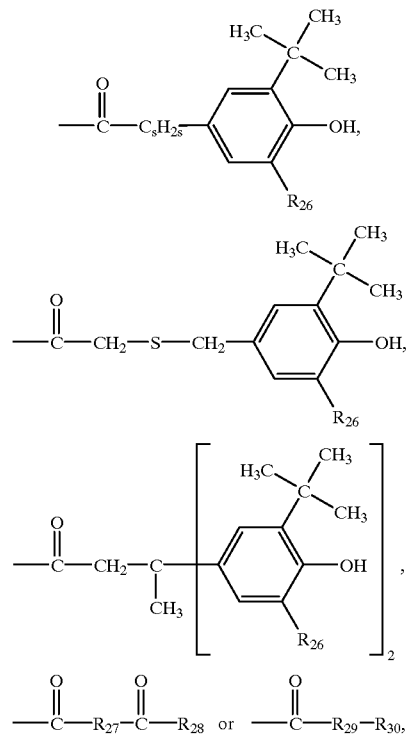

$R_{24}$ and $R_{25}$ are each independently of the other hydrogen or $C_1$–$C_{12}$alkyl, $R_{26}$ is hydrogen or $C_1$–$C_4$alkyl, $R_{27}$ is $C_1$–$C_{12}$alkylene, $C_2$–$C_8$alkenylene, $C_2$–$C_8$alkylidene, $C_7$–$C_{12}$phenylalkylidene, $C_5$–$C_8$cycloalkylene or phenylene, $R_{28}$ is hydroxy, $C_1$–$C_{12}$alkoxy or

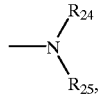

$R_{29}$ is oxygen or —NH—, $R_{30}$ is $C_1$–$C_{18}$alkyl or phenyl, and s is 1 or 2.

Compositions which are also preferred are those containing as component (b) at least one compound of formula I, wherein, if n=1, $R_1$ is phenanthryl, thienyl, dibenzofuryl, unsubstituted or $C_1$–$C_4$alkyl-substituted carbazolyl; or fluorenyl; or $R_1$ is a radical of formula II

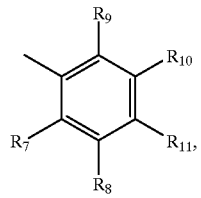

(II)

$R_7$, $R_8$, $R_9$, $R_{10}$ and $R_{11}$ are each independently of one another hydrogen, chloro, hydroxy, $C_1$–$C_{18}$alkyl, $C_1$–$C_{18}$alkoxy, $C_1$–$C_{18}$alkylthio, $C_3$–$C_4$alkenyloxy, $C_3$–$C_4$alkynyloxy, phenyl, benzoyl, benzoyloxy or

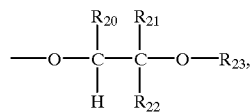

$R_{20}$ is hydrogen, $R_{21}$ is hydrogen, phenyl or $C_1$–$C_{18}$alkyl, or $R_{20}$ and $R_{21}$, together with the linking carbon atoms, form a cyclohexylene ring which is unsubstituted or substituted by 1 to 3 $C_1$–$C_4$alkyl, $R_{22}$ is hydrogen or $C_1$–$C_4$alkyl, and $R_{23}$ is hydrogen, $C_1$–$C_{12}$alkanoyl or benzoyl.

Particularly preferred compositions are those containing as component (b) at least one compound of formula I, wherein, if n=1, $R_7$, $R_8$, $R_9$, $R_{10}$ and $R_{11}$ are each independently of one another hydrogen, $C_1$–$C_{12}$alkyl, $C_1$–$C_4$alkylthio or phenyl.

Particularly interesting compositions are those containing as component (b) at least one compound of formula I, wherein $R_2$, $R_3$, $R_4$ and $R_5$ are each independently of one another hydrogen, chloro, $C_1$–$C_{18}$alkyl, benzyl, phenyl, $C_5$–$C_8$cycloalkyl, $C_1$–$C_{18}$alkoxy, $C_1$–$C_{18}$ alkylthio, $C_1$–$C_{18}$alkanoyloxy, $C_1$–$C_{18}$alkanoylamino, $C_3$–$C_{18}$alkenoyloxy or benzoyloxy; or $R_2$ and $R_3$, or $R_3$ and $R_4$, or $R_4$ and $R_5$, together with the linking carbon atoms, are a benzene ring, $R_4$ is additionally —(CH$_2$)$_p$—COR$_{15}$ or —(CH$_2$)$_q$OH or, if $R_3$, $R_5$ and $R_6$ are hydrogen, $R_4$ is additionally a radical of formula III, $R_{15}$ is hydroxy, $C_1$–$C_{12}$alkoxy or

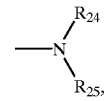

$R_{16}$ and $R_{17}$ are methyl groups or, together with the linking carbon atoms, are a $C_5$–$C_8$cycloalkylidene ring which is unsubstituted or substituted by 1 to 3 $C_1$–$C_4$alkyl, $R_{24}$ and $R_{25}$ are each independently of the other hydrogen or $C_1$–$C_{12}$alkyl, p is 1 or 2, and q is 2, 3, 4, 5 or 6.

Other particularly interesting compositions are those containing as component (b) at least one compound of formula I, wherein at least two of $R_2$, $R_3$, $R_4$ and $R_5$ are hydrogen.

Particularly interesting compositions are especially those containing as component (b) at least one compound of formula I, wherein $R_3$ and $R_5$ are hydrogen.

Very particularly interesting compositions are those containing as compnent (b) at least one compound of formula I, wherein $R_2$ is $C_1$–$C_4$alkyl, $R_3$ is hydrogen, $R_4$ is $C_1$–$C_4$alkyl or, if $R_6$ is hydrogen, $R_4$ is additionally a radical of formula III, $R_5$ is hydrogen, and $R_{16}$ and $R_{17}$, together with the linking carbon atom, are a cyclohexylidene ring.

The following compounds are examples of the benzofuran-2-one type which are particularly suitable as component (b) in the novel composition: 3-[4-(2-acetoxyethoxy)phenyl]-5,7-di-tert-butylbenzofuran-2-one; 5,7-di-tert-butyl-3-[4-(2-stearoyloxyethoxy)phenyl]-benzofuran-2-one; 3,3'-bis[5,7-di-tert-butyl-3-(4-[2-hydroxyethoxy]phenyl)benzofuran-2-one]; 5,7-di-tert-butyl-3-(4-ethoxyphenyl)benzofuran-2-one; 3-(4-acetoxy-3,5-dimethylphenyl)-5,7-di-tert-butylbenzofuran-2-one; 3-(3,5-dimethyl-4-pivaloyloxyphenyl)-5,7-di-tert-butyl-benzofuran-2-one; 5,7-di-tert-butyl-3-phenylbenzofuran-2-one; 5,7-di-tert-butyl-3-(3,4-dimethylphenyl)-benzofuran-2-one; 5,7-di-tert-butyl-3-(2,3-dimethylphenyl)benzofuran-2-one.

Particularly interesting compositions are also especially those containing as component (b) at least one compound of formula V

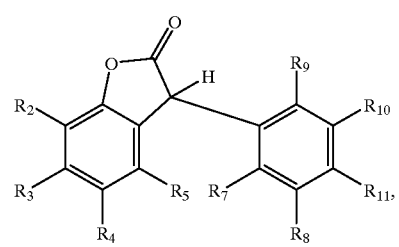

(V)

wherein
- $R_2$ is hydrogen or $C_1$–$C_6$alkyl,
- $R_3$ is hydrogen,
- $R_4$ is hydrogen or $C_1$–$C_6$alkyl,
- $R_5$ is hydrogen,
- $R_7$, $R_8$, $R_9$, $R_{10}$ and $R_{11}$, are each independently of one another hydrogen, $C_1$–$C_4$alkyl, $C_1$–$C_4$alkoxy or

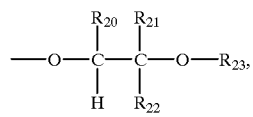

with the proviso that at least two of $R_7$, $R_8$, $R_9$, $R_{10}$ or $R_{11}$ are hydrogen,
$R_{20}$, $R_{21}$ and $R_{23}$ are hydrogen, and
$R_{23}$ is $C_2$–$C_4$alkanoyl.

Very particularly preferred compositions are those containing as component (b) at least one compound of formula Va or Vb

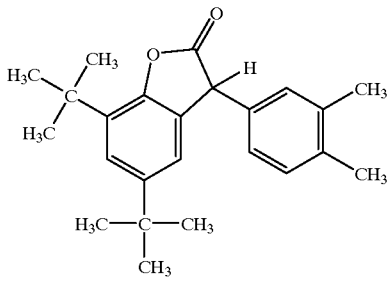

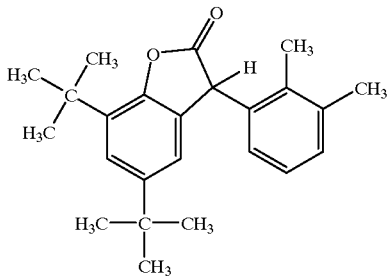

or a mixture of the two compounds of formula Va and Vb.

The benzofuran-2-one type compounds used as component (b) in the novel composition are known in the literature and their preparation is described, inter alia, in the following U.S. Pat. Nos. 4,325,863; 4,388,244; 5,175,312; 5,252,643; 5,216,052; 5,369,159; 5,488,117; 5,356,966; 5,367,008; 5,428,162; 5,428,177 or U.S. Pat. No. 5,516,920.

The benzofuran-2-one type compounds [component (b)] are suitable for stabilising polycarbonate, polyester or polyketone or their mixtures or blends against oxidative, thermal and/or light-induced degradation. It is of special importance that the benzofuran-2-one type compounds do not substantially reduce the transparency of these plastics when exposed to light or under oxidative or thermal stress and substantially prevent yellowing.

Accordingly, those novel compositions are also preferred wherein component (a) is a transparent, solid and vitreous moulded article.

Vitreous moulded articles are, for example, windows, windscreens, automobile light glasses, protective shields or packaging, such as bottles or films.

Particularly interesting compositions are those wherein the moulded article used as component (a) is transparent at a wavelength of 350 to 700 nm.

Polyesters (PES) may be homo- or copolyesters which are composed of aliphatic, cycloaliphatic or aromatic dicarboxylic acids and diols or hydroxycarboxylic acids.

The aliphatic dicarboxylic acids may contain 2 to 40 carbon atoms, the cycloaliphatic dicarboxylic acids may contain 6 to 10 carbon atoms, the aromatic dicarboxylic acids may contain 8 to 14 carbon atoms, the aliphatic hydroxycarboxylic acids may contain 2 to 12 carbon atoms, and the aromatic as well as the cycloaliphatic hydroxycarboxylic acids may contain 7 to 14 carbon atoms.

The aliphatic diols may contain 2 to 12 carbon atoms, the cycloaliphatic diols may contain 5 to 8 carbon atoms, and the aromatic diols can contain 6 to 16 carbon atoms.

Aromatic diols are those, wherein two hydroxyl groups are bound to one or different aromatic hydrocarbon radicals.

It is also possible that the polyesters are branched with small amounts, e.g. from 0.1 to 3 mol %, based on the dicarboxylic acids present, of more than difunctional monomers (e.g. pentaerythritol, trimellitic acid, 1,3,5-tri(hydroxyphenyl)benzene, 2,4-dihydroxybenzoic acid or 2-(4-hydroxyphenyl)-2-(2,4-dihydroxyphenyl)propane).

In polyesters consisting of at least 2 monomers, these can be randomly distributed or may be block copolymers.

Suitable dicarboxylic acids are linear and branched saturated aliphatic dicarboxylic acids, aromatic dicarboxylic acids, and cycloaliphatic dicarboxylic acids.

Aliphatic dicarboxylic acids are suitably those containing 2 to 40 carbon atoms, typically oxalic acid, malonic acid, dimethylmalonic acid, succinic acid, pimelic acid, adipic acid, trimethyladipic acid, sebacic acid, azelaic acid and dimeric acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane, 4,4'-dicyclohexyldicarboxylic acid.

Suitable aromatic dicarboxylic acids are: Preferably terephthalic acid, isophthalic acid, ophthalic acid as well as 1,3-,1,4-, 2,6- or 2,7-naphthalenedicarboxylic acid, 4,4'-diphenyldicarboxylic acid, 4,4'-diphenylsulfonedicarboxylic acid, 4,4'-benzophenonedicarboxylic acid, 1,1,3-trimethyl-5-carboxyl-3-(p-carboxylphenyl)indane, 4,4'-diphenyl ether dicarboxylic acid, bis-p(carboxylphenyl)methane, or bis-p(carboxylphenyl)ethane.

The aromatic dicarboxylic acids are preferred and of these, in particular, terephthalic acid, isophthalic acid and 2,6-naphthalenedicarboxylic acid.

Further suitable dicarboxylic acids are those containing —CO—NH groups; they are disclosed in DE-A-2 414 349. Dicarboxylic acids containing N-heterocyclic rings are also suitable, for example those which are derived from carboxylalkylated, carboxylphenylated or carboxybenzylated monoamine-s-triazinedicarboxylic acids (see DE-A-2 121 184 and 2 533 675), mono- or bishydantoins, benzimidazoles which may be halogenated, or parabanic acid. The carboxyalkyl groups can in this case contain 3 to 20 carbon atoms.

Suitable aliphatic diols are the linear and branched aliphatic glycols, preferably those of 2 to 12, preferably 2 to 6, carbon atoms in the molecule, for example: ethylene glycol, 1,2- and 1,3-propylene glycol, 1,2-, 1,3-, 2,3- or 1,4- butanediol, pentyl glycol, neopentyl glycol, 1,6-hexanediol, 1,12-dodecanediol. A suitable cycloaliphatic diol is, for example, 1,4-dihydroxycyclohexane. Further suitable aliphatic diols are typically 1,4-bis(hydroxymethyl) cyclohexane, aromatic-aliphatic diols, such as p-xylylene glycol or 2,5-dichloro-p-xylylene glycol, 2,2-(β-hydroxyethoxyphenyl)propane as well as polyoxyalkylene glycols, such as diethylene glycol, triethylene glycol, polyethylene glycol or polypropylene glycol. The alkylenediols are preferably linear and preferably contain 2 to 4 carbon atoms.

Preferred diols are the alkylenediols, 1,4-dihydroxycyclohexane and 1,4-bis(hydroxymethyl) cyclohexane. Ethylene glycol, 1,4-butanediol as well as 1,2- and 1,3-propylene glycol are particularly preferred.

Further suitable aliphatic diols are the -hydroxyalkylated, preferably β-hydroxyethylated, bisphenols such as 2,2-bis [4'-(β-hydroxyethoxy)phenyl]propane. Further bisphenols as indicated later.

Another group of suitable aliphatic diols are the heterocyclic diols disclosed in the German specifications 1 812 003, 2 342 432, 2 342 372 and 2 453 326. Illustrative examples are: N,N'-bis(β-hydroxyethyl)-5,5-dimethylhydantoin, N,N'-bis(β-hydroxypropyl)-5,5-dimethyl-hydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethyl)benzimidazolone, N,N'-bis(β-hydroxyethyl)-(tetrachloro)benzimidazolone, or N,N'-bis(β-hydroxyethyl)-(tetrabromo)benzimidazolone.

Suitable aromatic diols are mononuclear diphenols and, preferably, binuclear diphenols, which carry a hydroxyl group at each aromatic nucleus. Aromatic will preferably be understood as meaning aromatic hydrocarbon radicals such as phenylene or naphthylene. In addition to, for example, hydroquinone, resorcinol or 1,5-, 2,6- and 2,7-dihydroxynaphthalene, those bisphenols merit particular mention which can be illustrated by the following formulae:

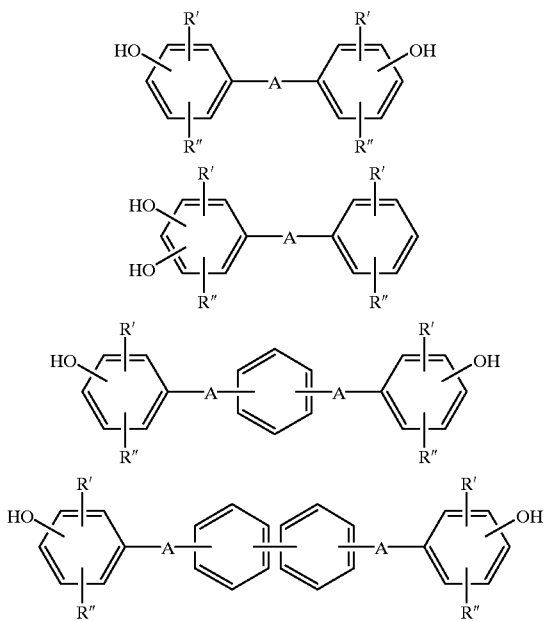

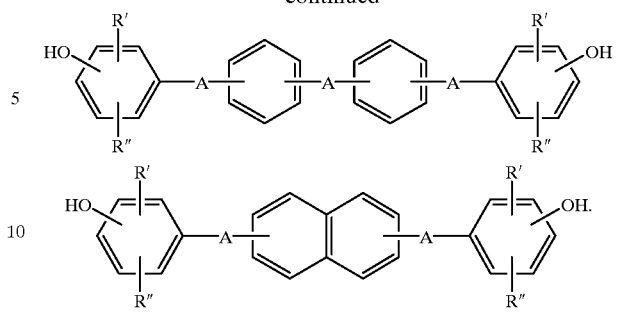

The hydroxyl groups can be in m-position, preferably in p-position, R' and R" in these formulae may be alkyl of 1 to 6 carbon atoms, halogen such as chloro or bromo and, preferably, hydrogen atoms. A can be a direct bond, or oxygen, sulfur, —SO—, —SO$_2$—,

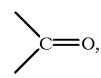

—P(O)(C$_1$–C$_{20}$alkyl)-, unsubstituted or substituted alkylidene, cycloalkylidene or alkylene.

Typical examples of unsubstituted or substituted alkylidene are ethylidene, 1,1- or 2,2-propylidene, 2,2-butylidene, 1,1-isobutylidene, pentylidene, hexylidene, heptylidene, octylidene, dichloroethylidene, trichloroethylidene.

Typical examples of unsubstituted or substituted alkylene are methylene, ethylene, phenylmethylene, diphenylmethylene, methylphenylmethylene. Typical examples of cycloalkylidene are cyclopentylidene, cyclohexylidene, cycloheptylidene and cyclooctylidene.

Illustrative examples of bisphenols are: bis(p-hydroxyphenyl)ether or bis(p-hydroxyphenyl)thioether, bis (p-hydroxyphenyl)sulfone, bis(p-hydroxyphenyl)methane, bis(4-hydroxyphenyl)-2,2'-biphenyl, phenylhydroquinone, 1,2-bis(p-hydroxyphenyl)ethane, 1-phenyl-bis(p-hydroxyphenyl)methane, diphenyl-bis(p-hydroxyphenyl) methane, diphenyl-bis(p-hydroxyphenyl)ethane, bis(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- or 2,2-bis(p-hydroxyphenyl)butane, 2,2-bis(p-hydroxyphenyl) hexafluoropropane, 1,1-dichloro- or 1,1,1-trichloro-2,2-bis (p-hydroxyphenyl)ethane, 1,1-bis(p-hydroxyphenyl) cyclopentane and, preferably, 2,2-bis(p-hydroxyphenyl) propane (bisphenol A) and 1,1-bis(p-hydroxyphenyl) cyclohexane (bisphenol C).

Suitable polyesters of hydroxycarboxylic acids are typically polycaprolactone, polypivalolactone or the polyesters of 4-hydroxycyclohexanecarboxylic acid or 4-hydroxybenzoic acid.

Polymers which are also suitable are those predominantly containing ester bonds, but which can also contain other bonds, e.g. polyester amides or polyester imides.

Polyesters containing aromatic dicarboxylic acids have become of the greatest importance, especially the polyalkylene terephthalates. Those novel moulding compounds are therefore preferred, wherein the polyester is composed of at least 30 mol %, preferably of at least 40 mol %, of aromatic dicarboxylic acids, and of at least 30 mol %, preferably of at least 40 mol %, of alkylenediols which preferably contain 2 to 12 carbon atoms, based on the polyester.

In this case the alkylenediol is preferably linear and contains 2 to 6 carbon atoms, typically ethylene-, tri-, tetra- or hexamethylene glycol, and the aromatic dicarboxylic acid terephthalic acid and/or isophthalic acid.

Particularly suitable polyesters are PEN (polyethylene naphthalate), PTT (polytriethylene terephthalate, PET (polyethylene terephthalate), PETG (glycol-modified polyethylene terephthalate) or PBT (polybutylene terephthalate) and corresponding copolymers or blends thereof. PET and its copolymers are particularly preferred.

As esters of carboxylic acid, polycarbonates (PC) are the simplest polyesters. Polycarbonates are obtained, for example from bisphenol A and phosgene or phosgene-analogon such as trichloromethylchloroformate, triphosgene or diphenylcarbonate by condensation, in the latter case usually with addition of a suitable transesterification catalyst, for example a boron hydride, an amine, e.g. 2-methylimidazole, or a quaternary ammonium salt. In addition to bisphenol A, other bisphenol components can also be used, and it is also possible to use monomers which are halogenated in the benzene nucleus. Particularly suitable bisphenol components to be mentioned are: 2,2-bis(4'-hydroxyphenyl)propane (bisphenol A), 2,4'-dihydroxydiphenylmethane, bis(2-hydroxyphenyl)methane, bis(4-hydroxyphenyl)methane, bis-(4-hydroxy-5-propylphenyl)methane, 1,1-bis(4'-hydroxyphenyl)ethane, bis(4-hydroxyphenyl)cyclohexylmethane, 2,2-bis(4'-hydroxyphenyl)-1-phenylpropane, 2,2-bis(3', 5'-dimethyl-4'-hydroxyphenyl)propane, 2,2-bis(3', 5'-dibromo-4'-hydroxyphenyl)propane, 2,2-bis(3',5'-dichloro-4'-hydroxyphenyl)propane, 1,1-bis(4'-hydroxyphenyl) cyclododecane, 1,1-bis(3'5, '-dimethyl-4'-hydroxyphenyl) cyclododecane, 1,1-bis(4'-hydroxyphenyl)-3,3,5-trimethylcyclohexane, 1,1-bis(4'-hydroxyphenyl)-3,3,5,5-tetramethylcyclohexane or 1,1-bis(4'-hydroxyphenyl)-3,3,5-trimethylcyclopentane. The polycarbonates can be branched by suitable amounts of more than difunctional monomers (examples as stated above).

In addition to blends of PES and PC, i.e. in particular PBT/PC and PET/PC, polymers to be used according to this invention are suitably also PC/ABS and ternary blends, such as blends of PBT/PC/ABS, PBT/PET/PC, PBT/PET/PC/ABS or PBT/PC/ASA.

The blends are prepared in customary manner from the starting polymers. The preferred PES component is PBT and the preferred PC component is a PC based on bisphenolA. The ratio of PES to PC is preferably from 95:5 to 5:95, a ratio wherein one component provides at least 70% being particularly preferred.

Owing to transesterification reactions, all PES/PC blends usually comprise are more or less large proportion of block copolymer structures, i.e. part of the blend is in the form of a PC/PES block copolymer. The inventive enhancement of the properties increases the compatibility of the polymers with one another. However, it is also possible to increase the compatibility with so-called compatibilisers. In the present case, these may be, for example, polyester/polycarbonate copolymers or also polyarylates (=aromat. polyester).

Particularly interesting compositions are those, wherein component (a) is a polycarbonate which is derived from bisphenol A.

Polyketones will be understood as meaning plastic materials which are prepared by polymerising carbon monoxide with unsaturated hydrocarbons, such as disclosed, inter alia, in EP-A-0 222 454 or EP-A-0 685 517.

Convenient compositions, as described above, are those wherein components (b) and (c) are present in an amount of 0.0005 to 5%, preferably of 0.001 to 2%, typically of 0.01 to 2%, based on the weight of component (a).

In addition to components (a) and (b), the novel compositions can comprise additional additives or costabilisers, for example the following:

1. Antioxidants 1.1. Alkylated monpohenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α, α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis (5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl- 4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1', 3'-dimethylbutyl)phenyl]amine, tert-octylated N-phenyl-1-naphthylamine, a mixture of mono- and dialkylated tert-butyl/tert-octyldiphenylamines-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6,-tetramenthylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-ditert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol); the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$$\frac{}{}$]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-α,α-dimethylbenzyl)-phenyl]-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piper idyl) sebacate, bis(1,2,2,6,6-pentamethyl-4-piperidyl) n-butyl-3, 5-di-tert-butyl[]hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2,3,4-butane-tetracarboxylate, 1,1'-(1,2-ethanediyl)-bis(3,3, 5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2, 4-dione, bis(1-octyloxy-2,2,6,6-tetramethylpiperidyl) sebacate, bis(1octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3dodecyl-1-(2,2,6,6-tetramethyl-4-piperidyl) pyrrolidin-2,5-dione, 3dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4, 6-trichloro-1,3,5-triazine as well as 4-butylamino-2,2,6,6-tetramethylpiperidine (CAS Reg. No. [136504-96-6]); N-(2, 2,6,6-tetramethyl-4-piperidyl)-n-dodecylsuccinimide, N-(1, 2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis-(2,2,6,6-tetramethyl-4-piperidyl) hexamethylenediamine, diester of 4-methoxy-methylenemalonic acid with 1,2,2,6,6-pentamethyl-4-hydroxypiperidine, poly[methylpropyl-3-oxy4-(2,2,6,6-tetramethyl-4-piperidyl)]siloxane, reaction product of maleic acid anhydride-α-olefine-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethyloxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4- tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2-ethylhexyl(3,3',5,5'-tetra-tert-butyl-1,1'-biphenyl-2,2'-diyl) phosphite.

Especially preferred are the following phosphites:

Tris(2,4-di-tert-butylphenyl)phosphite (Irgafos®168, Ciba-Geigy), tris(nonylphenyl)phosphite),

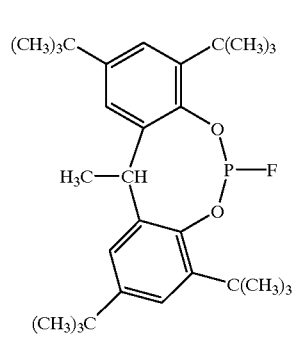
(A)

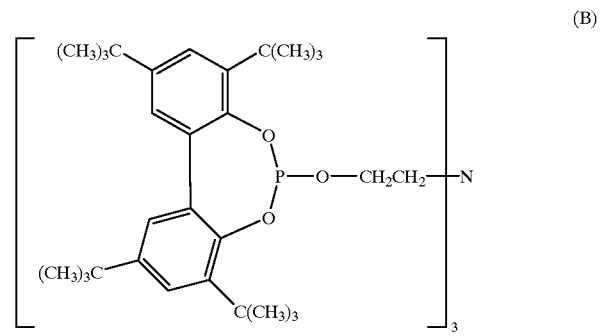
(B)

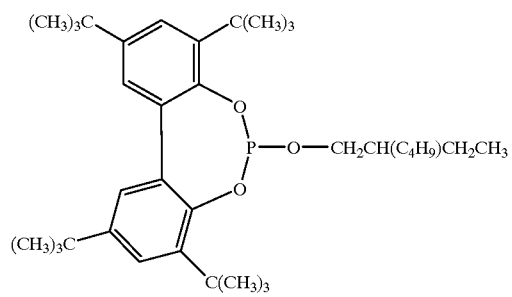
(C)

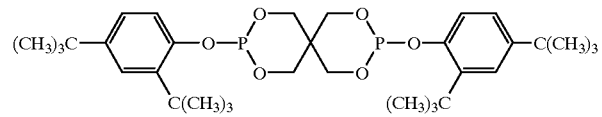
(D)

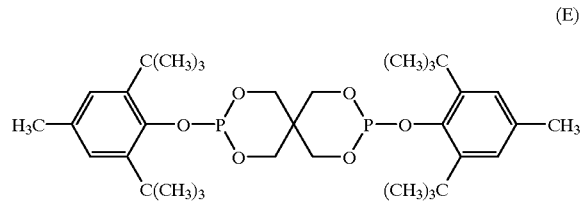
(E)

(F)

-continued

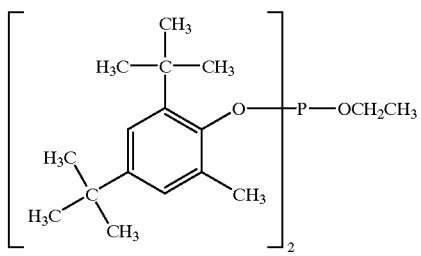
(G)

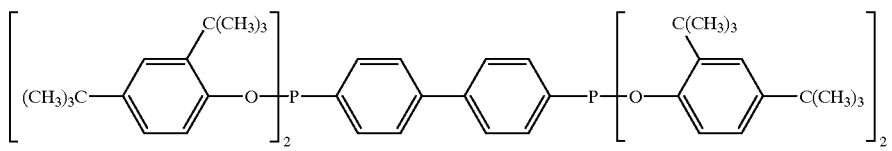
(H)

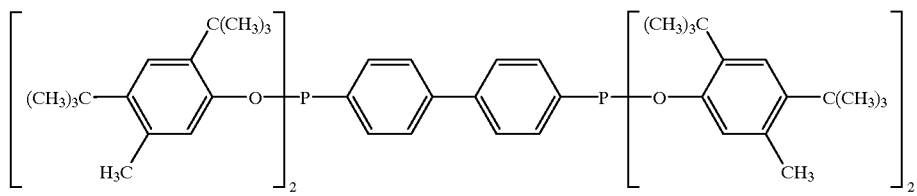
(I)

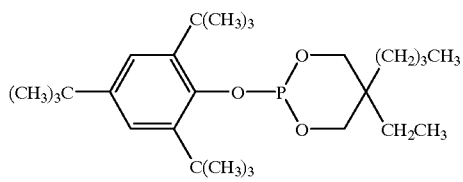
(K)

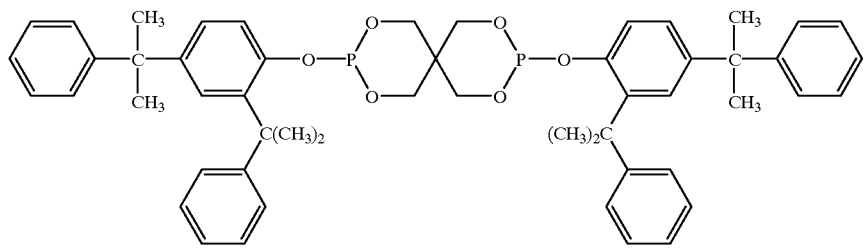
(L)

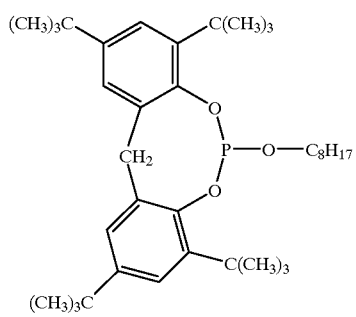
(M)

It is very particularly preferred to use tris(2,4-di-tert-butylphenyl)phosphite [Irgafos®168, Ciba Spezialitätenchemie], bis(2,4-di-tert-butyl-6-methylphenyl)ethyl phosphite [Irgafos®38, Ciba Spezialitätenchemie, formula (G)], Ultranox®626 [GE Chemicals, formula (D)], tetrakis (2,4-di-tert-butylphenyl)-4,4'-biphenylene diphosphonite [Irgafos®P-EPQ, Ciba Spezialitätenchemie, formula (H)], GSYA® 101 [Yoshitomi, formula (I)], Ultranox®641 [GE Chemicals, formula (K)], Doverphos®S9228 [Dover Chemicals, formula (L)] or Mark®HP10 [Adeka Argus, formula (M)].

5. Hydroxylamines, for example N,N-dibenzylhydroxylamine, N,N-diethylhydroxylamine, N,N-dioctylhydroxylamine, N,N-dilaurylhydroxylamine, N,N- ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zink pyrocatecholate.

10. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

11. Fillers and reinforcing agents, for example, calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

12. Triarylphosphines, for example triphenylphosphine.

13. Other additives, for example, plasticisers, lubricants, emulsifiers, pigments, rheology additives, catalysts, flow-control agents, optical brighteners, flameproofing agents, antistatic agents and blowing agents.

The costabilisers are added in concentrations of, for example, 0.01 to 10 %, based on the total weight of the polycarbonate, polyester or polyketone or their mixtures or blends to be stabilised.

Other preferred compositions comprise further additives in addition to components (a) and (b), in particular phenolic antioxidants, light stabilisers or/and processing stabilisers.

Particularly preferred additives are phenolic antioxidants (item 1 of the list), sterically hindered amines (item 2.6 of the list), phosphites and phosphonites (item 4 of the list), triarylphosphines (item 12 of the list) and UV absorbers (item 2.1; 2.2 and 2.8 of the list).

Component (b) and any further additives are incorporated into component (a) [polycarbonate, polyester or polyketone or their mixtures or blends] by known methods, typically before or during moulding, or alternatively by applying the dissolved or dispersed components (b) to the component (a), with subsequent evaporation of the solvent, when used. Component (b) can also be added to the materials to be stabilised [component (a)] in the form of a master-batch which contains these components in a concentration of 2.5 to 25 % by weight.

Component (b) can also be added before or during polymerisation or before crosslinking.

Component (b) can be incorporated into the component (a) to be stabilised in pure form or encapsulated in waxes, oils or polymers.

Component (b) can also be sprayed onto the component (a) to be stabilised. It is able to dilute other additives (e.g. the standard additives cited above) or their melts, so that they can also be sprayed onto the component (a) to be stabilised together with these additives. Application by spraying during deactivation of the polymerisation catalysts is particularly advantageous, in which case the steam used for the deactivation may be used for spraying.

The polycarbonates, polyesters and polyketones or their mixtures or blends which are stabilised in this manner can be used in a wide range of forms, typically including glasses, films, fibres, filaments, moulding compositions, profiles or binders for paints, in particular powder coatings, adhesives or putties. In a particularly preferred embodiment of this invention, the polycarbonates, polyesters and polyketones or their mixtures or blends which are stabilised in this manner are used as a glass substitute for e.g. windows, windshields, automobile light glasses or protective shields.

Component (b) is particularly suitable as processing stabiliser (heat stabiliser). To this end it is preferably added to component (a) before or during processing.

A preferred embodiment of this invention is therefore the use of the benzofuran-2-one type compounds [component (b)] as stabilisers for polycarbonates, polyesters or polyketones or their mixtures or blends [component (a)] against oxidative, thermal and/or light-induced degradation.

Component (b) is distinguished by its advantageous colour behaviour, i.e. minor discoloration of the polycarbonates, polyesters and polyketones or their mixtures or blends during processing.

This invention also relates to a process for stabilising polycarbonates, polyesters or polyketones or their mixtures or blends against oxidative, thermal and/or light-induced degradation, which comprises incorporating therein, or applying thereto, at least one benzofuran-2-one type compound [component (b)].

The preferred compounds of the benzofuran-2-one type for use as stabilisers and for the process for stabilising are the same as those described for the compositions with a polycarbonate, polyester or polyketone or their mixture or blends.

The invention is further illustrated by the following Examples in which parts and percentages are by weight.

EXAMPLE 1

Stabilisation of Polycarbonate 1.0 kg of a polycarbonate powder which has been dried for 8 hours at 120° C. in a vacuum drying oven (Lexan®115, of General Electric) and 0.1 to 0.6 g (0.01 to 0.06 %) of the stabilisers listed in Table 1 are mixed for 2 minutes in a Henschel mixer. This mixture is then extruded in a Schwabenthan extruder at a maximum of 280° C. The polymer string is then granulated. Using an injection moulding machine, plates having a layer thickness of 2 mm are then moulded from the granulate so obtained at a maximum of 300° C. These plates are then aged in a circulating air oven at 135° C. for 2000 hours. The yellowness index (YI) of these plates is then determined according to ASTM D 1925-70 and the transmission is determined in percent at 450 nm. Low YI values denote little discoloration, high YI values high discoloration of the patterns. The less discoloration, the more effective the stabiliser. The higher the transmission values, the more effective the stabiliser. The results are compiled in Tables 1 and 2.

TABLE 1

| Example | Stabilisers | Yellowness index prior to oven-ageing | Yellowness index after 2000 hours at 135° C. |
|---|---|---|---|
| 1a[a)] | — | 4.0 | 24.7 |
| 1b[a)] | 0.05% Irgafos ® 168[c)] | 3.3 | 23.1 |
| 1c[b)] | 0.01% compound (101)[d)] | 3.6 | 16.3 |
| 1d[b)] | 0.01% compound (102)[e)] | 4.1 | 14.2 |
| 1e[b)] | 0.05% Irgafos ® 168[c)] 0.01% compound (101)[d)] | 3.0 | 17.7 |
| 1f[b)] | 0.05% Irgafos ® 168[c)] 0.01% compound (102)[e)] | 3.0 | 14.6 |

TABLE 2

| Example | Stabilisers | Transmission in % prior to oven-ageing | Transmission in % after 2000 hours at 135° C. |
|---|---|---|---|
| 1a[a)] | — | 84.9 | 76.5 |
| 1b[a)] | 0.05% Irgafos ® 168[c)] | 84.8 | 77.9 |
| 1c[b)] | 0.01% compound (101)[d)] | 85.7 | 81.0 |
| 1d[b)] | 0.01% compound (102)[e)] | 85.6 | 81.5 |
| 1e[b)] | 0.05% Irgafos ® 168[c)] 0.01% compound (101)[d)] | 85.8 | 81.1 |
| 1f[e)] | 0.05% Irgafos ® 168[c)] 0.01% compound (102)[e)] | 86.2 | 81.6 |

[a)]Comparison Examples.
[b)]Example of this invention.
[c)]Irgafos ® 168 (Ciba Spezialitätenchemie AG) denotes tris(2,4-di-tert-butylphenyl)phosphite.
[d)]Compound (101) is a mixture of about 85 parts by weight of the compound of formula Va and about 15 parts by weight of the compound of formula Vb.

(Va)

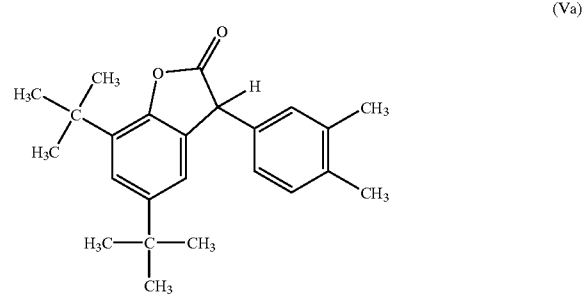

(Vb)

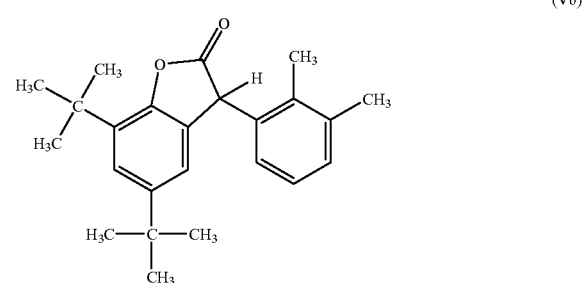

[e)]Compound (102) denotes 3-[4-(2-acetoxyethoxy)phenyl]-5,7-di-tert-butyl-benzofuran-2-one of formula Vc.

(Vc)

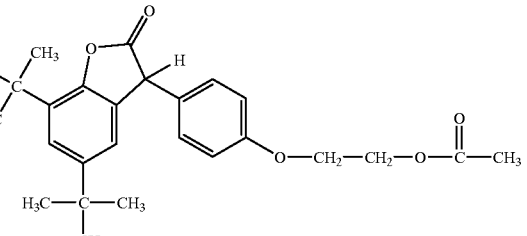

EXAMPLE 2
Stabilisation of Polycarbonate 1.0 kg of a polycarbonate powder which has been dried for 8 hours at 120° C. in a vacuum drying oven (Lexane®145, of General Electric) is charged with the stabilisers listed in Table 3 and is mixed for 2 minutes in a Henschel mixer. This mixture is then extruded in a Schwabenthan extruder at a maximum of 280° C. The polymer string is then granulated. Using an injection moulding machine, plates having a layer thickness of 2 mm are then moulded from the granulate so obtained at a maximum of 300° C. These plates are then aged in a circulating air oven at 135° C., the time in hours until the yellowness index (YI) reaches a value of 20 according to ASTM D 1925-70 being measured. The longer the time, the more effective the stabiliser. The results are compiled in Table 3.

TABLE 3

| Example | Stabilisers | Time in hours at 135° C. to YI = 20 |
|---|---|---|
| 2a[a)] | — | 1550 |
| 2b[a)] | 0.05% Irgafos ® 168[c)] | 2000 |
| 2c[b)] | 0.006% compound (101)[d)] 0.022% Irgafos ® 168[c)] 0.012% Irganox ® 1076[f)] | 2300 |
| 2d[b)] | 0.009% compound (101)[d)] 0.034% Irgafos ® 168[c)] 0.017% Irganox ® 1076[f)] | 2300 |

Footnotes a) to d) are explained at the end of Table 2.
[f)]Irganox ® 1076 (Ciba Spezialitätenchemie AG) denotes a compound of formula A (A)

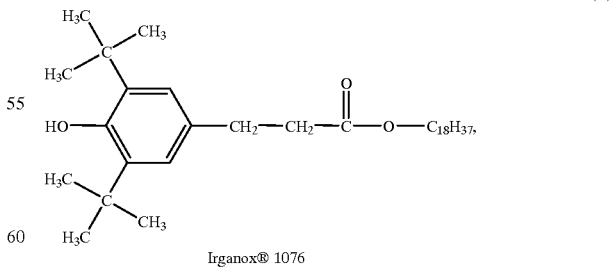

Irganox® 1076

EXAMPLE 3
Stabilisation of Polycarbonate 1.0 kg of a polycarbonate powder which has been dried for 8 hours at 120° C. in a vacuum drying oven (Lexan®145, of Firma General Electric) is charged with the stabilisers listed in Table 4 and is mixed for 2 minutes in a Henschel mixer. This mixture is then extruded in a Schwabenthan extruder at a maximum of 280° C. The polymer string is then granulated. Using an injection moulding machine, plates having a layer thickness of 2, 4 and 8 mm are then moulded from the granulate so obtained at a maximum of 300° C. The yellowness index (YI) of these plates is determined according to ASTM D 1925-70. Low YI values denote little discoloration, high YI values high discoloration of the plates. The less discoloration, the more effective the stabiliser or the stabiliser mixture. The results are compiled in Table 4.

TABLE 4

| Example | Stabilisers | Yellowness index of 2, 4 & 8 mm plates | | |
|---|---|---|---|---|
| | | 2 mm | 4 mm | 8 mm |
| 3a[a)] | — | 3.1 | 6.6 | 14.1 |
| 3b[b)] | 0.006% compound (101)[d)] 0.022% Irgafos ® 168[c)] 0.012% Irganox ®°1076[f)] | 0.4 | 2.0 | 4.8 |

Footnotes [a)] to [f)] are explained at the end of Tables 2 and 3.

EXAMPLE 4

Stabilisation of Polybutylene Terephthalate (PBT)

1.0 kg of a polybutylene terephthalate powder which has been dried for 10 hours at 100° C. in a vacuum drying oven (Crastin®S600, of Ciba Spezialitätenchemie AG) is charged with the stabilisers listed in Table 5 and is mixed for 2 minutes in a Henschel mixer. This mixture is then extruded in a twin-screw extruder (type Berstorff) at a maximum of 250° C. and is then granulated. In an injection moulding apparatus, the granulate so obtained is moulded at a maximum of 260° C. to little rods 4×6 mm thick and 50 mm long. These little rods are then aged in a circulating air oven at 160° C. After 360 hours the impact strength of the rods is measured in KJ/m$^2$. The higher the values, the better the stabilisation. The results are compiled in Table 5.

TABLE 5

Impact strength in the oven-ageing test at 160° C.

| Example | Stabilisers | Impact strength in KJ/m$^2$ | |
|---|---|---|---|
| | | after 0 h | after 360 h |
| 4a[a)] | — | 130 | 25 |
| 4b[a)] | 0.05% Irganox ® 245[g)] | 130 | 109 |
| 4c[a)] | 0.10% Irganox ® 245[g)] | 133 | 111 |
| 4d[a)] | 0.05% Irganox ® 245[g)] 0.05% Irgafos ® 168[c)] | 133 | 108 |
| 4e[b)] | 0.05% Irganox ® 245[g)] 0.05% Irgafos ® 168[c)] 0.02% compound (101)[d)] | 131 | 129 |

Footnotes a) to f) are explained at the end of Tables 2 and 3.
[g)]Irganox ® 245 (Ciba Spezialitätenchemie AG) denotes a compound of formula B

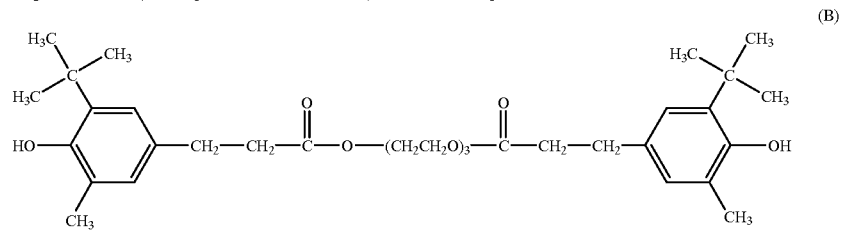

(B)

EXAMPLE 5

Stabilisation of Polycarbonate 1.0 kg of a polycarbonate powder which has been dried for 8 hours at 120° C. in a vacuum drying oven (Lexan®145, of General Electric) is charged with the stabilisers listed in Table 6 and is mixed for 2 minutes in a Henschel mixer. This mixture is then extruded in a Schwabenthan extruder at a maximum of 280° C. The polymer string is then granulated. Using an injection moulding machine, plates having a layer thickness of 2 mm are then moulded from the granulate so obtained at a maximum of 300° C. These plates are then irradiated in a Weather-O-Meter (WOM Cl 65) for 2500 hours at a black standard temperature of 63° C., at a dry/wet cycle of 102/18 minutes and at an intensity of 0.35 W/m$^2$ at 340 nm. The yellowness index (YI) of these plates is then determined according to ASTM D 1925-70. Low YI values denote little discoloration, high YI values high discoloration of the plates. The less discoloration, the more effective the stabiliser or the stabiliser mixture. The results are compiled in Table 6.

TABLE 6

| Example | Stabilisers | Yellowness index after 2500 h exposure to light |
|---|---|---|
| 5a[a)] | — | 30.2 |
| 5b[a)] | 0.30% Tinuvin ® 234[h)] | 17.9 |
| 5c[a)] | 0.30% Tinuvin ® 360[i)] | 16.5 |
| 5d[a)] | 0.30% Tinuvin ® 1577[j)] | 11.0 |
| 5e[b)] | 0.30% Tinuvin ® 234[h)] 0.02% compound (101)[d)] | 17.0 |
| 5f[b)] | 0.30% Tinuvin ® 360[i)] 0.02% compound (101)[d)] | 15.1 |
| 5g[b)] | 0.30% Tinuvin ® 1577[j)] 0.02% compound (101)[d)] | 10.0 |

TABLE 6-continued

| Example | Stabilisers | Yellowness index after 2500 h exposure to light |
|---|---|---|
| 5h[b)] | 0.30% Tinuvin ® 234[h)]<br>0.05% Irgafos ® 168[c)]<br>0.02% compound (101)[d)] | 13.7 |
| 5i[b)] | 0.30% Tinuvin ® 360[i)]<br>0.05% Irgafos ® 168[c)]<br>0.02% compound (101)[d)] | 12.2 |
| 5j[b)] | 0.30% Tinuvin ® 1577[j)]<br>0.05% Irgafos ® 168[c)]<br>0.02% compound (101)[d)] | 9.7 |

Footnotes a) to f) are explained at the end of Tables 2 and 3.
[h)]Tinuvin ® 234 (Ciba Spezialitätenchemie AG) denotes a compound of formula UV-1

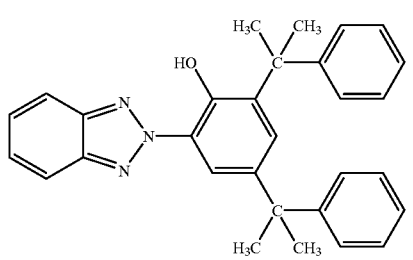

(UV-1)

Tinuvin® 234

[i)]Tinuvin ® 360 (Ciba Spezialitätenchemie AG) denotes a compound of formula UV-2

(UV-2)

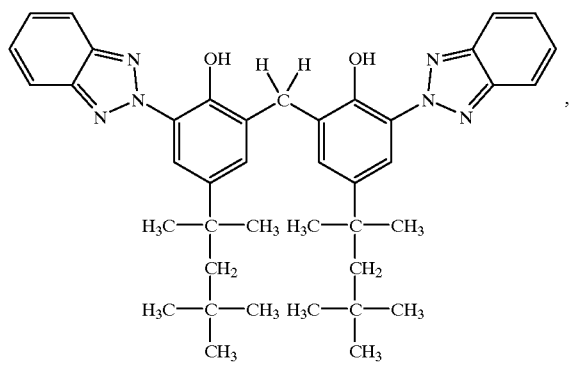

Tinuvin® 360

TABLE 6-continued

| Example | Stabilisers | Yellowness index after 2500 h exposure to light |
|---|---|---|

[j)]Tinuvin ® 1577 (Ciba Spezialitätenchemie AG) denotes a compound of formula UV-3

(UV-3)

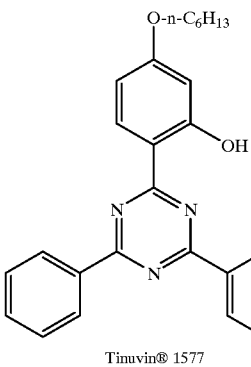

Tinuvin® 1577

EXAMPLE 6

Stabilisation of Polycarbonate 1.0 kg of a polycarbonate powder which has been dried for 8 hours at 120° C. in a vacuum drying oven (Lexanr145, of General Electric) is charged with the stabilisers listed in Table 7 and is then mixed for 2 minutes in a Henschel mixer. This mixture is then extruded in a Schwabenthan extruder at a maximum of 280° C. The polymer string is then granulated. The granulate so obtained is packed into 1 cm thick polystyrene boxes and the yellowness index (YI) is determined according to ASTM D 1925-70. Low YI values denote little discoloration, high YI values high discoloration of the samples. The less discoloration, the more effective the stabiliser or the stabiliser mixture. The results are compiled in Table 7.

TABLE 7

| Example | Stabilisers | Yellowness index |
|---|---|---|
| 6a[a)] | — | 10.1 |
| 6b[b)] | 0.05% GSY ® P101[k)] | 5.0 |
| 6c[b)] | 0.04% GSY ® P101[k)]<br>0.02% compound (101)[d)] | 1.0<br>1.0 |

Footnotes a, b and d are explained at the end of Table 2.
[k)]GSY ® P101 (Yoshitomi) denotes a compound of formula I TABLE 7-continued

| Example | Stabilisers | Yellowness index |
|---------|-------------|------------------|

(I)

[structure: bis-phosphite with two di-tert-butyl-methyl-phenoxy groups linked via P-O to a biphenyl diyl P-O, shown as bracketed ]$_2$ ... ]$_2$

EXAMPLE 7
Stabilisation of Polyesters 2.5 kg of a polyester which has been dried for 12 hours at 120° C. in a vacuum drying oven (Polyclear® T86, of Hoechst) is charged with the stabilisers listed in Table 8 and is mixed for 2 hours in a Henschel mixer. This mixture is then extruded in a Schwabenthan extruder at a maximum of 275° C. The polymer string is then granulated. The granulate so obtained is dried for another 12 hours in a vacuum drying oven. In a double determination, 500 mg of the granulate is heated over 10 minutes to 290° C. and is stored for 1 hour under pure oxygen in a rancimate at 290° C. The resulting gaseous separation products are continuously led into an aqueous collecting solution and the conductivity ($\mu$S) of this solution is continuously measured. Low conductivity values signify that few separation products are formed, high conductivity values signify that very many separation products are formed. The lower the conductivity values, the more effective the stabiliser. The results are compiled in Table 8.

TABLE 8

| Example | Stabilisers | Conductivity ($\mu$S) |
|---------|-------------|------------------------|
| 7a[a)] | — | 46 |
| 7b[b)] | 0.20% compound (101)[d)] | 33 |

Footnotes [a)], [b)] and [d)] are explained at the end of Table 2.

EXAMPLE 8
Stabilisation of Polyesters 2.5 kg of a polyester which has been dried for 12 hours at 120° C. in a vacuum drying oven (Polyclear®T86, of Hoechst) is charged with the stabilisers listed in Table 9 and are mixed for 2 hours in a Henschel mixer. This mixture is then extruded in a Schwabenthan extruder at a maximum of 275° C. The polymer string is then granulated. The granulate so obtained is, dried for another 12 hours in a vacuum drying oven. Starting from a starting temperature of 30° C., 15 mg of the granulate are subjected to a heating programme in a thermographimeter (Mettler Thermo Gravimeter). On heating, separation products are formed, reducing the weight of the original sample. The temperature is measured at which the sample reaches a weight loss of 1%. The higher the temperature at which 1% weight loss are reached, the better the stabilisation. The results are compiled in Table 9.

TABLE 9

| Example | Stabilisers | Temperature (° C.) |
|---------|-------------|--------------------|
| 8a[a)] | — | 271 |
| 8b[b)] | 0.20% compound (101)[d)] | 277 |

Footnotes [a)], [b)] and [d)] are explained at the end of Table 2.

EXAMPLE 9
Stabilisation of Polyesters 2.5 kg of a polyester which has been dried for 12 hours at 120° C. in a vacuum drying oven (Polyclear®T86, of Hoechst) are charged with the stabilisers listed in Table 10 and are mixed for 2 hours in a Henschel mixer. This mixture is then extruded in a Schwabenthen extruder at a maximum of 275° C. The polymer string is then granulated. The granulate so obtained is dried for another 12 hours in a vacuum drying oven. Starting from a starting temperature of 30° C., 15 mg of the granulate are then subjected to a heating programme in a thermographimeter (Mettler Thermo Gravimeter). On heating, separation products are formed, reducing the weight of the original sample. Measurement is terminated upon reaching 290° C. and the weight loss of the sample is determined. The lower the weight loiss reached at 290° C., the more efficient the stabilisation. The results are compiled in Table 10.

TABLE 10

| Example | Stabilisers | Weight loss in % at 290° C. |
|---------|-------------|------------------------------|
| 9a[a)] | — | 3.0 |
| 9b[b)] | 0.20% compound (101)[d)] | 2.5 |

Footnotes [a)], [b)] and [d)] are explained at the end of Table 2.

What is claimed is:
1. A composition, which comprises
   a) a transparent, solid and vitreous moulded article which is transparent at a wavelength of 350 to 700 nm and composed of a polycarbonate, polyester or polyketone or a mixture thereof which is subject to oxidative, thermal and/or light-induced degradation, and
   b) at least one benzofuran-2-one compound of formula I

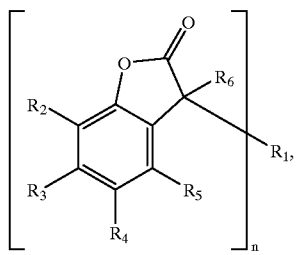

(I)

wherein,
if n=1,
$R_1$ is naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl, each of which is unsubstituted or substituted by $C_1$–$C_4$alkyl, $C_1$–$C_4$alkoxy, $C_1$–$C_4$alkylthio, hydroxy, halogen, amino, $C_1$–$C_4$alkylamino, phenylamino or di($C_1$–$C_4$-alkyl)amino, or $R_1$ is a radical of formula II

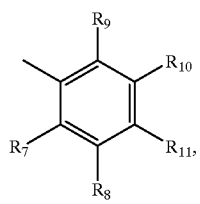
(II)

and, if n=2, $R_1$ is unsubstituted or $C_1$–$C_4$alkyl- or hydroxy-substituted phenylene or naphthylene; or —$R_{12}$—X—$R_{13}$—, $R_2$ $R_3$, $R_4$ and $R_5$ are each independently of one another hydrogen, chloro, hydroxy, $C_1$–$C_{25}$-alkyl, $C_7$–$C_9$phenylalkyl, unsubstituted or $C_1$–$C_4$alkyl-substituted phenyl; unsubstituted or $C_1$–$C_4$alkyl-substituted $C_5$–$C_8$cycloalkyl; $C_1$–$C_{18}$alkoxy, $C_1$–$C_{18}$alkylthio, $C_1$–$C_4$alkylamino, di($C_1$–$C_4$-alkyl)amino, $C_1$–$C_{25}$alkanoyloxy, $C_1$–$C_{25}$alkanoylamino, $C_3$–$C_{25}$alkenoyloxy; $C_3$–$C_{25}$alkanoyloxy which is interrupted by oxygen, sulfur or

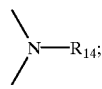

$C_6$–$C_9$cycloalkylcarbonyloxy, benzoyloxy or $C_1$–$C_{12}$alkyl-subsbtuted benzoyloxy; or $R_2$ and $R_3$, or $R_3$ and $R_4$, or $R_4$ and $R_5$, together with the linking carbon atoms, form a benzene ring, $R_4$ is additional —$(CH_2)_p$—$COR_{15}$ or —$(CH_2)_q$OH or, if $R_3$, $R_5$ and $R_6$ are hydrogen, $R_4$ is additionally a radical of formula III

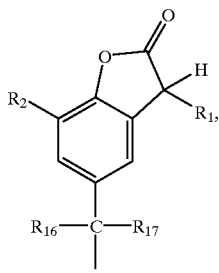
(III)

wherein $R_1$ is as defined above for n=1, $R_6$ is hydrogen or a radical of formula IV

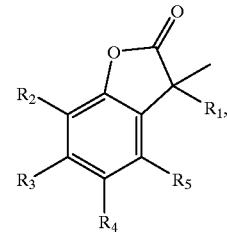
(IV)

wherein $R_4$ is not a radical of formula III, and $R_1$ is as defined above for n=1, $R_7$, $R_8$, $R_9$, $R_{10}$ and $R_{11}$ are each independently of one another hydrogen, halogen, hydroxy, $C_1$–$C_{25}$alkyl; $C_2$–$C_{25}$alkyl which is interrupted by oxygen, sulfur or

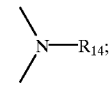

$C_1$–$C_{25}$alkoxy; $C_2$–$C_{25}$alkoxy which is interrupted by oxygen, sulfur or

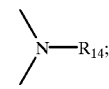

$C_1$–$C_{25}$alkylthio, $C_3$–$C_{25}$-alkenyl, $C_3$–$C_{25}$alkenyloxy, $C_3$–$C_{25}$alkynyl, $C_3$–$C_{25}$alkynyloxy, $C_7$–$C_9$phenylalkyl, $C_7$–$C_9$phenylalkoxy, unsubstituted or $C_1$–$C_4$alkyl-substituted phenyl; unsubstituted or $C_1$–$C_4$alkyl-substituted phenoxy; unsubstituted or $C_1$–$C_4$alkyl-substituted $C_5$–$C_8$cycloalkyl; unsubstituted or $C_1$–$C_4$alkyl-substituted $C_5$–$C_8$cycloalkoxy; $C_1$–$C_4$alkylamino, di($C_1$–$C_4$alkyl)amino, $C_1$–$C_{25}$alkanoyl; $C_3$–$C_{25}$alkanoyl which is interrupted by oxygen, sulfur or

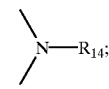

$C_1$–$C_{25}$alkanoyloxy; $C_3$–$C_{25}$alkanoyloxy which is interrupted by oxygen, sulfur or

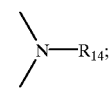

$C_1$–$C_{25}$alkanoylamino, $C_3$–$C_{25}$alkenoyl; $C_3$–$C_{25}$alkenoyl which is interrupted by oxygen, sulfur or $$\diagdown N{-}R_{14};$$

$C_3$–$C_{25}$alkenoyloxy; $C_3$–$C_{25}$alkenoyloxy which is interrupted by oxygen, sulfur or $$\diagdown N{-}R_{14};$$

$C_6$–$C_9$cycloalkylcarbonyl, $C_6$–$C_9$cycloalkylcarbonyloxy, benzoyl or $C_1$–$C_{12}$alkyl-substituted benzoyl; benzoyloxy or $C_1$–$C_{12}$alkyl-substituted benzoyloxy;

$$-\!\!-O\!-\!\!\underset{R_{19}}{\overset{R_{18}}{C}}\!\!-\!\!\overset{O}{\overset{\|}{C}}\!\!-\!\!R_{15} \quad \text{or} \quad -\!\!-O\!-\!\!\underset{H}{\overset{R_{20}}{C}}\!\!-\!\!\underset{R_{22}}{\overset{R_{21}}{C}}\!\!-\!\!O\!-\!\!R_{23}$$

or in formula II, $R_7$ and $R_8$, or $R_8$ and $R_{11}$, together with the linking carbon atoms, form a benzene ring, $R_{12}$ and $R_{13}$ are each independently of the other unsubstituted or $C_1$–$C_4$alkyl-substituted phenylene or naphthylene, $R_{14}$ is hydrogen or $C_1$–$C_8$alkyl, $R_{15}$ is hydroxy, $$\left[-\!\!-O^-\ \tfrac{1}{r}\ M^{r+}\right],$$

$C_1$–$C_{18}$alkoxy or $$-\!\!-N\!\!\diagup^{R_{24}}_{R_{25},}$$

$R_{16}$ and $R_{17}$ are each independently of the other hydrogen, $CF_3$, $C_1$–$C_{12}$alkyl or phenyl, or $R_{16}$ and $R_{17}$, together with the linking carbon atom, are a $C_5$–$C_8$cycloalkylidene ring which is unsubstituted or substituted by 1 to 3 $C_1$–$C_4$alkyl;

$R_{18}$ and $R_{19}$ are each independently of the other hydrogen, $C_1$–$C_4$alkyl or phenyl, $R_{20}$ is hydrogen or $C_1$–$C_4$alkyl, $R_{21}$ is hydrogen, unsubstituted or $C_1$–$C_4$alkyl-substituted phenyl; $C_1$–$C_{25}$alkyl; $C_2$–$C_{25}$alkyl which is interrupted by oxygen, sulfur or $$\diagdown N{-}R_{14};$$

$C_7$–$C_9$phenylalkyl which is unsubstituted or substituted at the phenyl moiety by 1 to 3 $C_1$–$C_4$alkyl; $C_7$–$C_{25}$phenylalkyl which is interrupted by oxygen, sulfur or $$\diagdown N{-}R_{14}$$

and which is unsubstituted or substituted at the phenyl moiety by 1 to 3 $C_1$–$C_4$alkyl or, $R_{20}$ and $R_{21}$, together with the linking carbon atoms, form a $C_5$–$C_{12}$cycloalkylene ring which is unsubstituted or substituted by 1 to 3 $C_1$–$C_4$alkyl;

$R_{22}$ is hydrogen or $C_1$–$C_4$alkyl, $R_{23}$ is hydrogen, $C_1$–$C_{25}$alkanoyl, $C_3$–$C_{25}$alkenoyl; $C_3$–$C_{25}$alkanoyl which is interrupted by oxygen, sulfur or $$\diagdown N{-}R_{14};$$

$C_2$–$C_{25}$alkanoyl which is substituted by a di($C_1$–$C_6$alkyl)phosphonate group; $C_6$–$C_9$cycloalkylcarbonyl, thienoyl, furoyl, benzoyl or $C_1$–$C_{12}$alkyl-substituted benzoyl;

$$-\!\!-\overset{O}{\overset{\|}{C}}\!\!-\!\!C_8H_{25}\!\!-\!\!\!\diagup\!\!\!\diagdown\!\!\underset{R_{26}}{-\!\!OH},\ \text{(with } H_3C\!-\!\!\overset{CH_3}{\overset{|}{C}}\!\!-\!\!CH_3 \text{ substituent)}$$

$$-\!\!-\overset{O}{\overset{\|}{C}}\!\!-\!\!CH_2\!\!-\!\!S\!\!-\!\!CH_2\!\!-\!\!\diagup\!\!\!\diagdown\!\!\underset{R_{26}}{-\!\!OH},\ \text{(with } H_3C\!-\!\!\overset{CH_3}{\overset{|}{C}}\!\!-\!\!CH_3 \text{ substituent)}$$

$$\left[-\!\!-\overset{O}{\overset{\|}{C}}\!\!-\!\!CH_2\!\!-\!\!\overset{CH_3}{\underset{CH_3}{C}}\!\!-\!\!\diagup\!\!\!\diagdown\!\!\underset{R_{26}}{-\!\!OH}\right]_2,\ \text{(with } H_3C\!-\!\!\overset{CH_3}{\overset{|}{C}}\!\!-\!\!CH_3 \text{ substituent)}$$

$$-\!\!-\overset{O}{\overset{\|}{C}}\!\!-\!\!R_{27}\!\!-\!\!\overset{O}{\overset{\|}{C}}\!\!-\!\!R_{28} \quad \text{or} \quad -\!\!-\overset{O}{\overset{\|}{C}}\!\!-\!\!R_{29}\!\!-\!\!R_{30},$$

$R_{24}$ and $R_{25}$ are each independently of the other hydrogen or $C_1$–$C_{18}$alkyl, $R_{26}$ is hydrogen or $C_1$–$C_8$alkyl, $R_{27}$ is a direct bond, $C_1$–$C_{18}$alkylene; $C_2$–$C_{18}$alkylene which is interrupted by oxygen, sulfur or $$\diagdown N{-}R_{14};$$

$C_2$–$C_{18}$alkenylene, $C_2$–$C_{20}$alkylidene, $C_7$–$C_{20}$phenylalkylidene, $C_5$–$C_8$cyclo alkylene, $C_7$–$C_8$bicycloalkylene, unsubstituted or $C_1$–$C_4$alkyl-substituted phenylene,

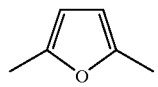

or

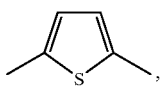

$R_{28}$ is hydroxy

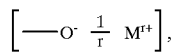

$C_1$–$C_{18}$alkyloxy or

$R_{29}$ is oxygen, —NH— or

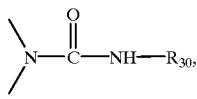

$R_{30}$ is $C_1$–$C_{18}$alkyl or phenyl,
$R_{31}$ is hydrogen or $C_1$–$C_{18}$alkyl,
M is an r-valent metal cation,
X is a direct bond, oxygen, sulfur or —$NR_{31}$—,
n is 1 or 2,
p is 0, 1 or 2,
q is 1, 2, 3, 4, 5 or 6,
r is 1, 2 or 3, and
s is 0, 1 or 2.

2. A composition according claim 1, wherein component (b) is a compound of formula V

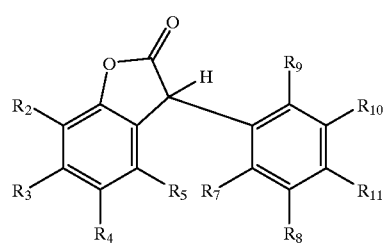

(V)

wherein
$R_2$ is hydrogen or $C_1$–$C_6$alkyl,
$R_3$ is hydrogen,
$R_4$ is hydrogen or $C_1$–$C_6$alkyl,
$R_5$ is hydrogen,
$R_7$, $R_8$, $R_9$, $R_{10}$ and $R_1$ are each independently of one another hydrogen, $C_1$–$C_4$alkyl, $C_1$–$C_4$-alkoxy or

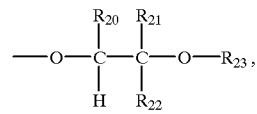

with the proviso that at least two of $R_7$, $R_8$, $R_9$, $R_{10}$ or $R_{11}$ are hydrogen,
$R_{20}$, $R_{21}$ and $R_{23}$ are hydrogen, and
$R_{23}$ is $C_2$–$C_4$alkanoyl.

3. A composition according to claim 1, wherein component (b) is a compound of formula Va or Vb

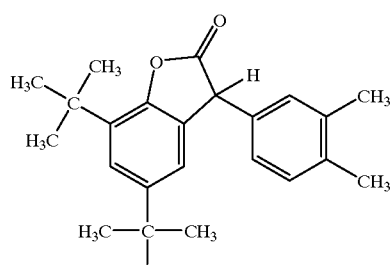

(Va)

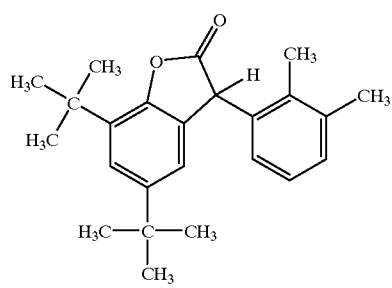

(Vb)

or a mixture of the two compounds of formulae Va and Vb.

4. A composition according to claim 1, wherein the polycarbonate component (a) is derived from bisphenol A.

5. A composition according to claim 1, wherein the polyester in component (a) is a PEN (polyethylene naphthalate), PTT (polytriethylene terephthalate), PET (polyethylene terephthalate), PETG (glycol-modified polyethylene terephthalate) or PBT (polybutylene terephthalate) or a copolymer thereof.

6. A composition according to claim 1, wherein component (b) is present in an amount of 0.0005 to 5%, based on the weight of component (a).

7. A composition according to claim 1, which additionally comprises phenolic antioxidants, UV absorbers, light stabilisers or/and processing stabilisers as further additives in addition to components (a) and (b).

8. A composition according to claim 7, which comprises as further additives phenolic anti-oxidants, UV absorbers, light stabilisers or/and processing stabilisers.

9. A composition according to claim 7, which comprises as further additive at least one organic phosphite or phosphonite compound.

10. A method of stabilising a transparent, solid and vitreous moulded article which is transparent at a wavelength of 350 to 700 nm and composed of a polycarbonate, polyester or polyketone or their mixtures against oxidative, thermal and/or light-induced degradation, which comprises incorporating therein, or applying thereto, at least one benzofuran-2-one compound of formula I

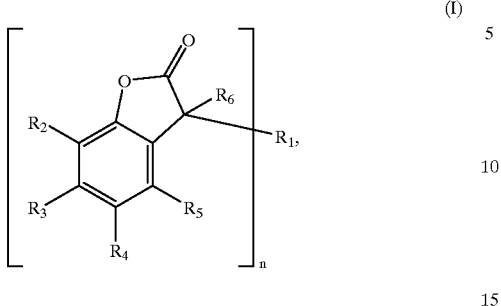

wherein,
if n=1,
R₁ is naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl, each of which is unsubstituted or substituted by $C_1$–$C_4$alkyl, $C_1$–$C_4$alkoxy, $C_1$–$C_4$alkylthio, hydroxy, halogen, amino, $C_1$–$C_4$alkylamino, phenylamino or di($C_1$–$C_4$-alkyl)amino, or R₁ is a radical of formula II

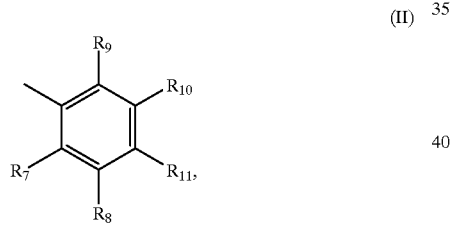

and,
if n=2,
R₁ is unsubstituted or $C_1$–$C_4$alkyl- or hydroxy-substituted phenylene or naphthylene; or —R₁₂—X—R₁₃—, R₂, R₃, R₄ and R₅ are each independently of one another hydrogen, chloro, hydroxy, $C_1$–$C_{25}$-alkyl, $C_7$–$C_9$phenylalkyl, unsubstituted or $C_1$–$C_4$alkyl-substituted phenyl; unsubstituted or $C_1$–$C_4$alkyl-substituted $C_5$–$C_8$cycloalkyl; $C_1$–$C_{18}$alkoxy, $C_1$–$C_{18}$alkylthio, $C_1$–$C_4$alkylamino, di($C_1$–$C_4$-alkyl)amino, $C_1$–$C_{25}$alkanoyloxy, $C_1$–$C_{25}$alkanoylamino, $C_3$–$C_{25}$alkenoyloxy; $C_3$–$C_{25}$alkanoyloxy which is interrupted by oxygen, sulfur or

$C_6$–$C_9$cycloalkylcarbonyloxy, benzoyloxy or $C_1$–$C_{12}$alkyl-substituted benzoyloxy; or R₂ and R₃, or R₃ and R₄, or R₄ and R₅, together with the linking carbon atoms, form a benzene ring, R₄ is additionally —(CH₂)$_p$—COR₁₅ or —(CH₂)$_q$OH or, if R₃, R₅ and R₆ are hydrogen, R₄ is additionally a radical of formula III

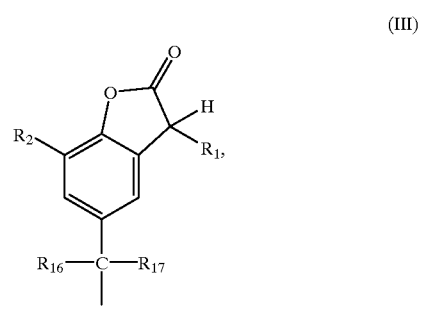

wherein
R₁ is as defined above for n=1,
R₆ is hydrogen or a radical of formula IV

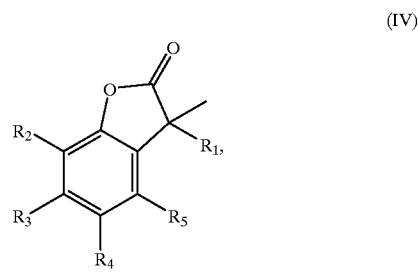

wherein
R₄ is not a radical of formula III, and R₁ is as defined above for n=1
R₇, R₈, R₉, R₁₀ and R₁₁ are each independently of one another hydrogen, halogen, hydroxy, $C_1$–$C_{25}$alkyl which is interrupted by oxygen, sulfur or

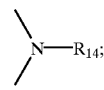

$C_1$–$C_{25}$alkoxy; $C_2$–$C_{25}$alkoxy which is interrupted by oxygen, sulfur or

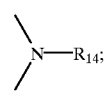

$C_1$–$C_{25}$alkylthio, $C_3$–$C_{25}$-alkenyl, $C_3$–$C_{25}$alkenyloxy, $C_3$–$C_{25}$alkynyl, $C_3$–$C_{25}$alkynyloxy, $C_7$–$C_9$phenylalkyl, $C_7$–$C_9$phenylalkoxy, unsubstituted or $C_1$–$C_4$alkyl-substituted phenyl; unsubstituted or $C_1$–$C_4$alkyl-substituted phenoxy; unsubstituted or $C_1$–$C_4$alkyl-substituted $C_5$–$C_8$cycloalkyl; unsubstituted or $C_1$–$C_4$alkyl-substituted $C_5$–$C_8$cycloalkoxy; $C_1$–$C_4$alkylamino, di($C_1$–$C_4$alkyl)amino, $C_1$–$C_{25}$alkanoyl; $C_3$–$C_{25}$alkanoyl which is interrupted by oxygen, sulfur or

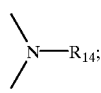

$C_1$–$C_{25}$alkanoyloxy; $C_3$–$C_{25}$alkanoyloxy which is interrupted by oxygen, sulfur or

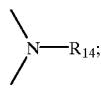

$C_1$–$C_{25}$alkanoylamino, $C_3$–$C_{25}$alkenoyl; $C_3$–$C_{25}$alkenoyl which is interrupted by oxygen, sulfur or

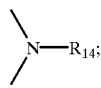

$C_3$–$C_{25}$alkonoyloxy, $C_3$–$C_{25}$alkenoyloxy which is interrupted by oxygen, sulfur or

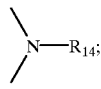

$C_6$–$C_9$cycloalkylcarbonyl $C_8$–$C_9$cycloalkylcarbonyloxy, benzoyl or $C_1$–$C_{12}$alkyl-substituted benzoyl; benzoyloxy or $C_1$–$C_{12}$alkyl-substituted benzoyloxy;

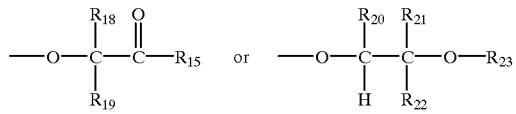

or in formula II, $R_7$ and $R_8$, or $R_8$ and $R_{11}$, together with the linking carbon atoms, form a benzene ring, $R_{12}$ and $R_{13}$ are each independently of the other unsubstituted or $C_1$–$C_4$alkyl-substituted phenylene; or naphthylene, $R_{14}$ is hydrogen or $C_1$–$C_8$alkyl, $R_{15}$ is hydroxy,

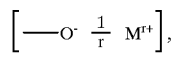

$C_1$–$C_{18}$alkoxy or

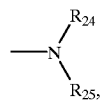

$R_{16}$ and $R_{17}$ are each independently of the other hydrogen, $CF_3$, $C_1$–$C_{12}$alkyl or phenyl, or $R_{16}$ and $R_{17}$, together with the linking carbon atom, are a $C_5$–$C_8$cycloalkylidene ring which is unsubstituted or substituted by 1 to 3 $C_1$–$C_4$alkyl;

$R_{18}$ and $R_{19}$ are each independently of the other hydrogen, $C_1$–$C_4$alkyl or phenyl, $R_{20}$ is hydrogen or $C_1$–$C_4$alkyl, $R_{21}$ is hydrogen, unsubstituted or $C_1$–$C_4$alkyl-substituted phenyl; $C_1$–$C_{25}$alkyl; $C_2$–$C_{25}$alkyl which is interrupted by oxygen, sulfur or

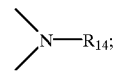

$C_7$–$C_9$phenylalkyl which is unsubstituted or substituted at the phenyl moiety by 1 to 3 $C_1$–$C_4$alkyl; $C_7$–$C_{25}$phenylalkyl which is interrupted by oxygen, sulfur or

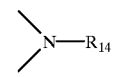

and which is unsubstituted or substituted at the phenyl moiety by 1 to 3 $C_1$–$C_4$alkyl, or $R_{20}$ and $R_{21}$, together with the linking carbon atoms, form a $C_5$–$C_{12}$cycloalkylene ring which is unsubstituted or substituted by 1 to 3 $C_1$–$C_4$alkyl;

$R_{22}$ is hydrogen or $C_1$–$C_4$alkyl, $R_{23}$ is hydrogen, $C_1$–$C_{25}$alkanoyl, $C_3$–$C_{25}$alkenoyl; $C_3$–$C_{25}$alkanoyl which is interrupted by oxygen, sulfur or

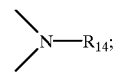

$C_2$–$C_{25}$ alkanoyl which is substituted by a di($C_1$–$C_6$alkyl)phosphonate group; $C_6$–$C_9$cycloalkylcarbonyl, thienoyl, furoyl, benzoyl or $C_1$–$C_{12}$alkyl-substituted benzoyl;

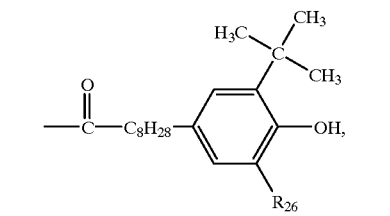

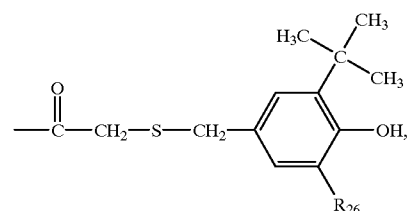

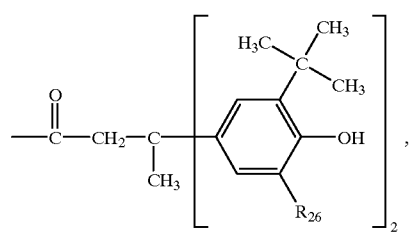

-continued

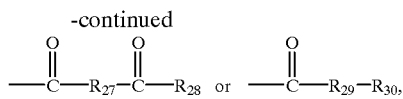

$R_{24}$ and $R_{25}$ are each independently of the other hydrogen or $C_1$–$C_{18}$alkyl, $R_{26}$ is hydrogen or $C_1$–$C_8$alkyl, $R_{27}$ is a direct bond, $C_1$–$C_{18}$alkylene; $C_2$–$C_{18}$alkylene which is interrupted by oxygen, sulfur or

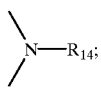

$C_2$–$C_{18}$alkenylene, $C_2$–$C_{20}$alkylidene, $C_7$–$C_{20}$phenylalkylidene, $C_5$–$C_8$cyclo alkylene, $C_7$–$C_8$bicycloalkylene, unsubstituted or $C_1$–$C_4$alkyl-substituted phenylene,

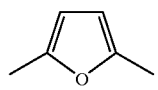

or

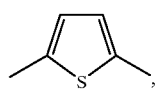

$R_{28}$ is hydroxy,

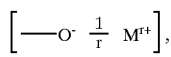

$C_1$–$C_{18}$alkoxy or

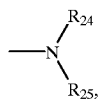

$R_{29}$ is oxygen, —NH— or

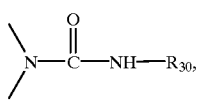

$R_{30}$ is $C_1$–$C_{18}$alkyl or phenyl, $R_{31}$ is hydrogen or $C_1$–$C_{18}$alkyl, M is an r-valent metal cation, X is a direct bond, oxygen, sulfur or —$NR_{31}$—, n is 1 or 2, p is 0, 1 or 2, q is 1, 2, 3, 4, 5 or 6, r is 1, 2 or 3, and s is 0, 1 or 2.

11. A composition according to claim 1, wherein component (b) is a compound of formula Va or Vb

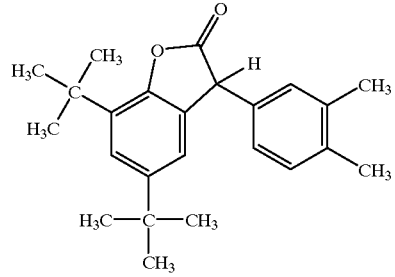

(Va)

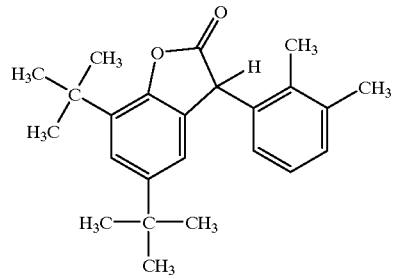

(Vb)

or a mixture of the two compounds of formulae Va and Vb; or a compound of formula Vc

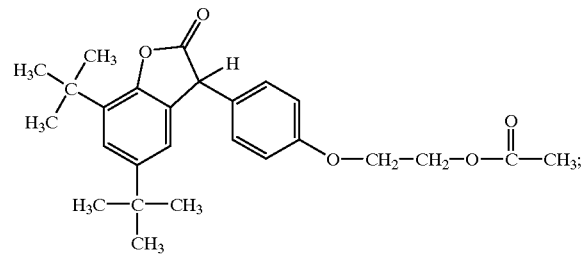

(Vc)

which additionally comprises in addition to components (a) and (b) further additives selected from the group consisting of tris(2,4di-tert-butylphenyl)phosphite, a compound of formula A

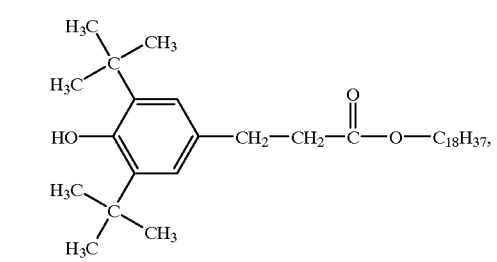

(A)

a compound of formula B

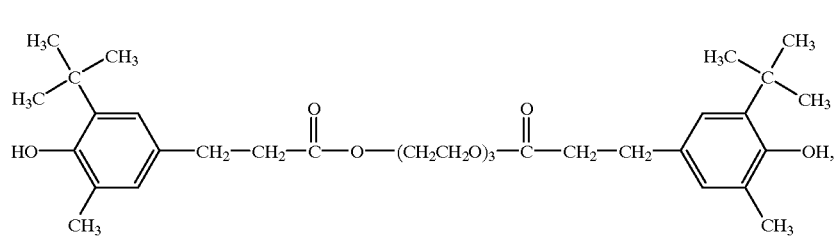
(B)
a compound of formula UV-1
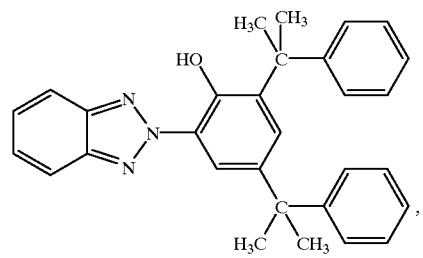
(UV-1)
a compound of formula UV-2
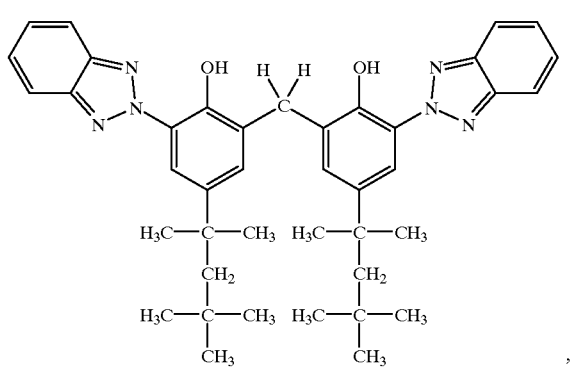
(UV-2)
a compound of formula UV-3
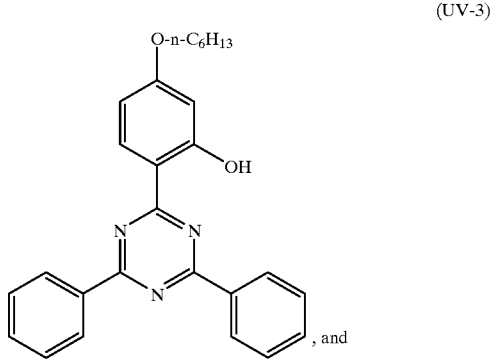
(UV-3)
, and
a compound of formula I'
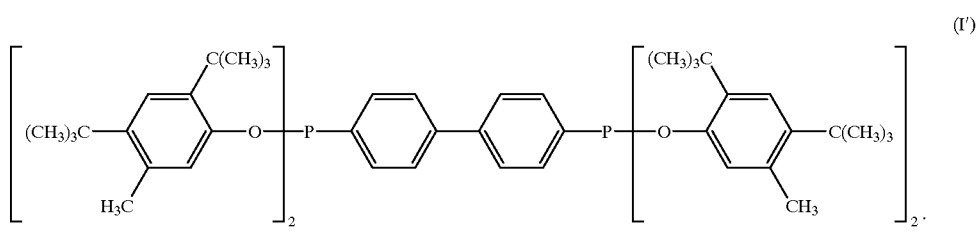
(I')
* * * * *